(12) United States Patent
Rho et al.

(10) Patent No.: US 6,888,604 B2
(45) Date of Patent: May 3, 2005

(54) LIQUID CRYSTAL DISPLAY

(75) Inventors: Soo-Guy Rho, Kyungki-do (KR);
Keun-Kyu Song, Yongin (KR);
Jeong-Ye Choi, Suwon (KR);
Nam-Seok Roh, Sungnam (KR);
Cheol-Woo Park, Suwon (KR);
Mun-Pyo Hong, Sungnam (KR);
Ho-Yong Jeong, Suwon (KR)

(73) Assignee: Samsung Electronics Co., Ltd. (KR)

( * ) Notice: Subject to any disclaimer, the term of this patent is extended or adjusted under 35 U.S.C. 154(b) by 64 days.

(21) Appl. No.: 10/640,479

(22) Filed: Aug. 12, 2003

(65) Prior Publication Data

US 2004/0169807 A1 Sep. 2, 2004

(30) Foreign Application Priority Data

Aug. 14, 2002 (KR) .................................. 10-2002-0048058
Nov. 20, 2002 (KR) .................................. 10-2002-0072289

(51) Int. Cl.[7] ............................................ G02F 1/1343
(52) U.S. Cl. ........................ 349/146; 349/144; 349/145
(58) Field of Search ................................. 349/139, 143, 349/144, 145, 146, 106, 109

(56) References Cited

U.S. PATENT DOCUMENTS 5,146,356 A * 9/1992 Carlson ........................ 349/38
5,311,337 A * 5/1994 McCartney, Jr. ............ 349/145
2003/0071943 A1 * 4/2003 Choo et al. .................. 349/106

OTHER PUBLICATIONS

Elliot, Candice Hellen Brown. Active Matrix Display Layout Optimization, Aug. 22, 2000, http://www.pentile.com/IDMC2000.pdf.*

ClairVoyante Laboratories, Inc., Technology for Human Vision; "Development Proposal"; pp. 1–7; Dec. 2000.

* cited by examiner

Primary Examiner—Tarifur R. Chowdhury
Assistant Examiner—David Chung
(74) Attorney, Agent, or Firm—Cantor Colburn LLP

(57) ABSTRACT

A liquid crystal display includes an array pixel including a plurality of pixels arranged in a matrix. The plurality of pixels include a set of pixels including a pair of center pixels adjacent to each other, and a pair of first-color pixels and a pair of second-color pixels obliquely facing each other across the center pixels. Each pixel includes a pixel electrode and a thin film transistor. The liquid crystal display further includes a plurality of gate lines extending in a row direction for transmitting a gate signal to the pixels, and a plurality of data lines extending in a column direction for transmitting data signals to the pixels. The pixels are subject to polarity inversion.

32 Claims, 26 Drawing Sheets

| R | B | G | R | B | G |
|---|---|---|---|---|---|
| G | B | R | G | B | R |
| R | B | G | R | B | G |
| G | B | R | G | B | R |

| B | R | G | B | R | G |
|---|---|---|---|---|---|
| G | R | B | G | R | B |
| B | R | G | B | R | G |
| G | R | B | G | R | B |

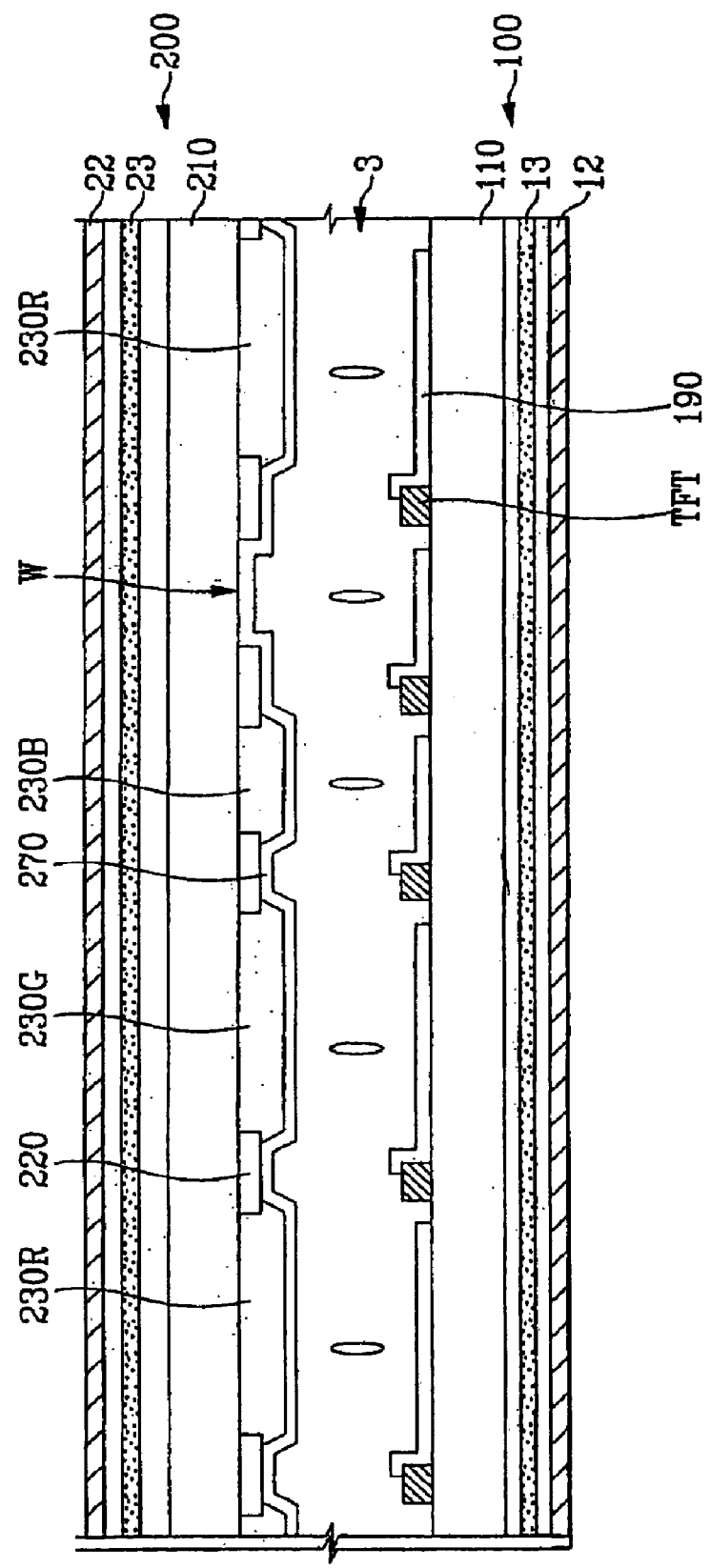

FIG.21

LIQUID CRYSTAL DISPLAY

BACKGROUND OF THE INVENTION (a) Field of the Invention

The present invention relates to a liquid crystal display.

(b) Description of Related Art

Generally, a liquid crystal display (LCD) includes a liquid crystal panel assembly including two panels provided with two kinds of field generating electrodes such as pixel electrodes and a common electrode and a liquid crystal layer with dielectric anisotropy interposed therebetween. The variation of the voltage difference between the field generating electrodes, i.e., the variation in the strength of an electric field generated by the electrodes changes the transmittance of the light passing through the LCD, and thus desired images are obtained by controlling the voltage difference between the electrodes.

The LCD includes a plurality of pixels with pixel electrodes and red (R), green (G) and blue (B) color filters. The pixels are driven to perform display operation by way of the signals applied thereto through display signal lines. The signal lines include gate lines (or scanning signal lines) for carrying the scanning signals, and data lines for carrying data signals. Each pixel has a thin film transistor (TFT) connected to one of the gate lines and one of the data lines to control the data signals applied to the pixel electrode.

Meanwhile, there are several types of arrangement of the red (R), green (G) and blue (B) color filters. Examples are a stripe type where the color filters of the same color are arranged in the same pixel columns, a mosaic type where the red, green and blue color filters are arranged in turn along the row and column directions, and a delta type where the pixels are arranged zigzag in the column direction and the red, green and blue color filters are arranged in turn. The delta type correctly represents a circle or a diagonal line.

The ClairVoyante Laboratories has proposed a pixel arrangement called the "PenTile Matrix.," which is advantageous in displaying high resolution images while gives minimized design cost. In such a pixel arrangement, the unit pixel of blue is common to two dots, and the neighboring blue pixels receive the data signals from one data driving IC while being driven by two different gate driving ICs. With the use of the PenTile Matrix pixel structure, the resolution of the ultra extended graphics array (UXGA) level can be realized by way of a display device of the super video graphics array (SVGA) level. Furthermore, the number of low-cost gate driving ICs is increased, but the number of high-cost data driving ICs is decreased. This minimizes the production cost for the display device.

However, with the PenTile Matrix pixel structure, as the size of the blue pixel is different from the size of the red and the green pixels, it is required to make alteration of the storage capacity due to the difference in the liquid crystal charge rate. Furthermore, as two blue pixels are driven by way of one line, the pixel polarities are non-uniformly made.

SUMMARY OF THE INVENTION

A liquid crystal display is provided, which includes: an array of a plurality of sets of pixels, each set including blue and white pixels adjacent to each other, a pair of red pixels obliquely facing each other across the blue and the white pixels, and a pair of green pixels obliquely facing each other across the blue and the white pixels and adjacent to the red pixels, each pixel including a pixel electrode and a thin film transistor; a plurality of gate lines extending in a row direction for transmitting a gate signal to the pixels; and a plurality of data lines extending in a column direction for transmitting data signals to the pixels.

It is preferable that the blue pixel and the white pixel in a set of pixels have equal polarity, the red pixels in the set have equal polarity, and the green pixels in the set have equal polarity. The polarity of the pixels may be subject to column inversion or 2×1 inversion.

Alternatively, it is preferable that the blue pixel and the white pixel in a set of pixels have equal polarity, the red pixels in the set have opposite polarity, and the green pixels in the set have opposite polarity. The polarity of the pixels may be subject to 2×1 inversion.

The relative positions of the blue pixel and the white pixel in two sets of pixels adjacent in a column direction or in a row direction are reversed.

The pixels have rectangular shapes and the blue and the white pixels are arranged in the column direction to form a separate column or the blue and the whit pixels have triangular shapes to form a diamond shape. A boundary line between the blue pixel and the white pixel may extend in the row direction or the column direction.

The red pixels in adjacent two columns may be located in different rows and the red pixels in adjacent rows are located in different columns. The green pixels in adjacent two columns are placed in different rows and the green pixels in adjacent rows are located in different columns. Either the blue pixels or the white pixels in two sets of pixels adjacent in the row direction are located in different rows, or the blue pixels or the white pixels in two sets adjacent in the column direction are located in different columns.

The liquid crystal display is preferably driven by rendering.

The liquid crystal display may further include a backlight unit providing light for the pixels. The light emitted from the backlight unit preferably has a color coordinate (x, y) where x ranges from about 0.31 to about 0.34, and y ranges from about 0.32 to about 0.35.

The red, green and blue pixels may further include red, green and blue organic filters containing red, green and blue pigments, respectively, and the white pixels may include transparent organic filters.

The red, green, blue and white pixels may further include a common electrode formed on the organic filters and/or an overcoat located between the organic filters and the common electrode.

The transparent organic filter may include the same material as the overcoat.

Preferably, the height of a surface of the overcoat is substantially uniform.

The red, green, blue and white pixels may further include red, green and blue color filters, respectively. The red, green, blue and white pixels further include: a protective layer formed on the thin film transistors, having a plurality of protrusions, and facing the color filters; a common electrode formed on the color filters; and a liquid crystal interposed between the pixel electrode and the common electrode. The protrusions are provided in the white pixels, and height of the common electrode is smaller at the white pixel than at the red, the green and the blue pixels.

Preferably, the distance between the common electrode and a surface of the protective layer is substantially uniform.

The pixel electrodes and the common electrode may have cutouts.

A liquid crystal display is provided, which includes: an array pixel including a plurality of pixels arranged in a matrix, the plurality of pixels including a set of pixels including a pair of center pixels adjacent to each other, and a pair of first-color pixels and a pair of second-color pixels obliquely facing each other across the center pixels, each pixel including a pixel electrode and a thin film transistor; a plurality of gate lines extending in a row direction for transmitting a gate signal to the pixels; and a plurality of data lines extending in a column direction for transmitting data signals to the pixels, wherein the pixels are subject to polarity inversion.

The center pixels in a set of pixels have equal polarity, the first-color pixels in the set have equal polarity, and the second-color pixels in the set have equal polarity.

The polarity inversion includes column inversion or 2×1 inversion.

The center pixels in a set of pixels have equal polarity, the first-color pixels in the set have opposite polarity, and the second-color pixels in the set have opposite polarity.

The polarity inversion may include 2×1 inversion.

The center pixels represent blue color, and the first-color pixels and the second-color pixels represent green and red colors, respectively. Alternatively, the center pixels represent red color, and the first-color pixels and the second-color pixels represent green and blue colors, respectively. Alternatively, the center pixels represent blue and white colors, and the first-color pixels and the second-color pixels represent green and red colors, respectively.

The center pixels may have different saturation, and the center pixels preferably represent red color.

BRIEF DESCRIPTION OF THE DRAWINGS

The above and other advantages of the present invention will become more apparent by describing preferred embodiments thereof in detail with reference to the accompanying drawings in which:

FIG. 11 is a sectional view of an LCD according to another embodiment of the present invention;

FIGS. 21 to 23 illustrate pixel arrangements for an LCD according to other embodiments of the present invention;

DETAILED DESCRIPTION OF PREFERRED EMBODIMENTS

Figure 1:
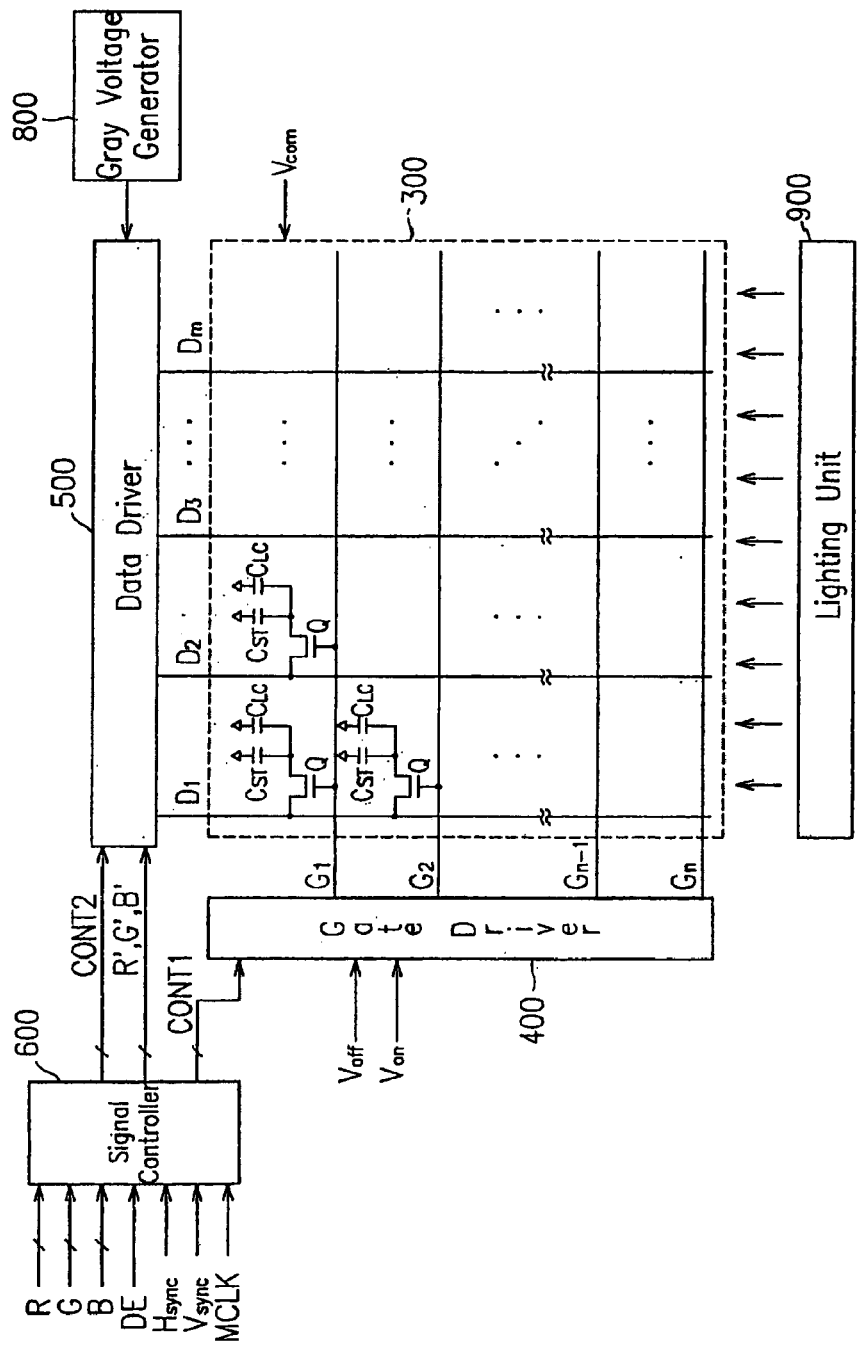
FIG. 1 is a block diagram of an LCD according to an embodiment of the present invention.

The present invention now will be described more fully hereinafter with reference to the accompanying drawings, in which preferred embodiments of the inventions are shown.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Now, LCDs according to embodiments of this invention will be described in detail with reference to the accompanying drawings.

Figure 2:
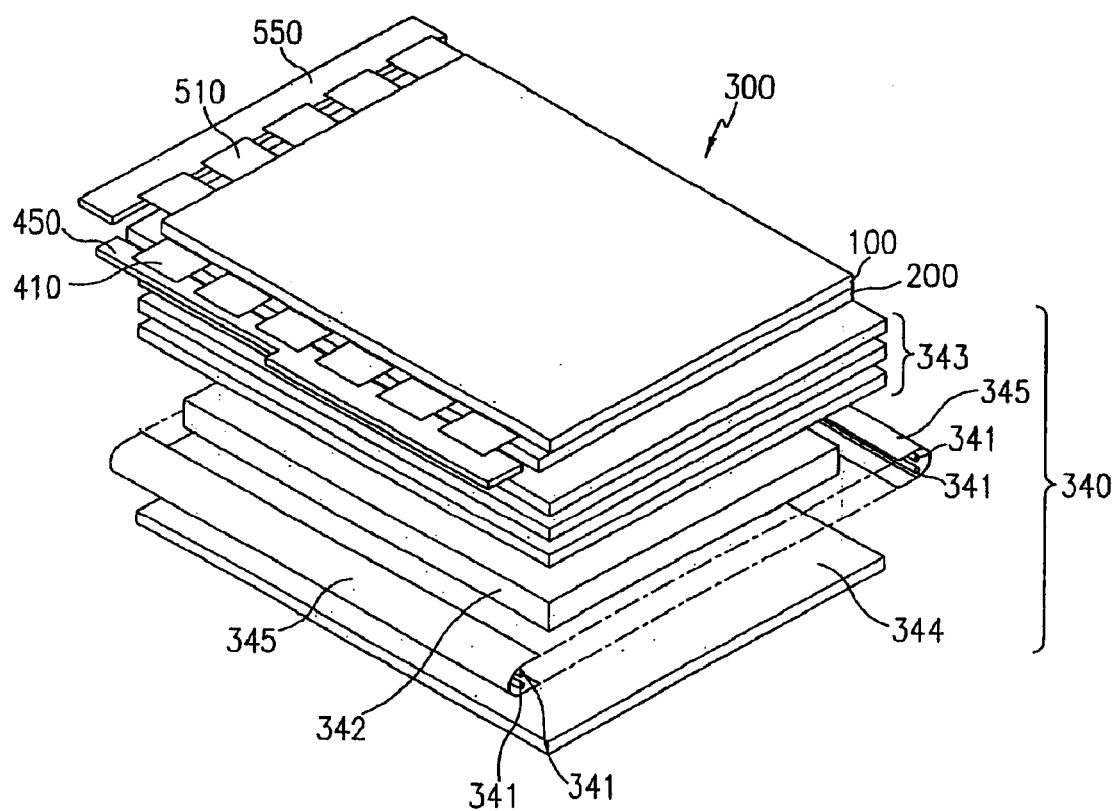
FIG. 2 is an exploded perspective view of an LCD according to an embodiment of the present invention.
Figure 3:
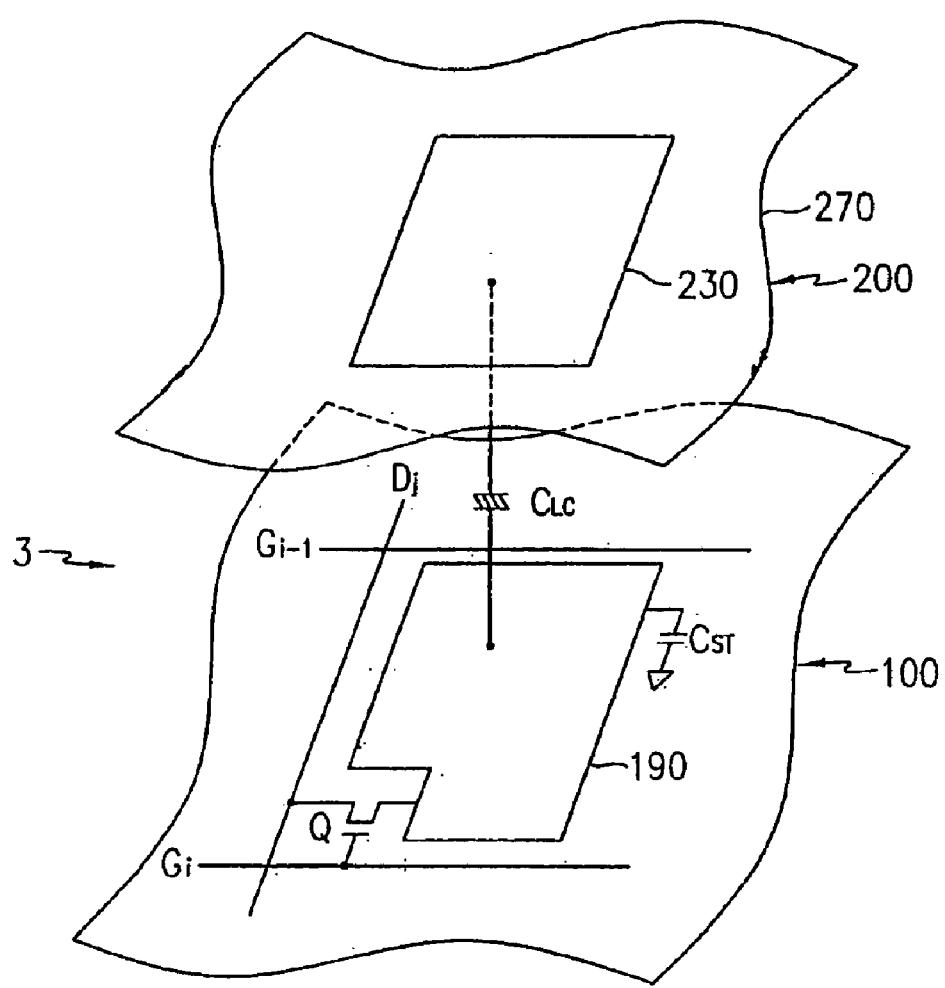
FIG. 3 is an equivalent circuit diagram of a pixel of an LCD according to an embodiment of the present invention.

FIG. 1 is a block diagram of an LCD according to an embodiment of the present invention, FIG. 2 is an exploded perspective view of an LCD according to an embodiment of the present invention, and FIG. 3 is an equivalent circuit diagram of a pixel of an LCD according to an embodiment of the present invention.

Referring to FIG. 1, an LCD according to an embodiment of the present invention includes a LC panel assembly 300, a gate driver 400 and a data driver 500 which are connected to the panel assembly 300, a gray voltage generator 800 connected to the data driver 500, a lighting unit 900 for illuminating the panel assembly 300, and a signal controller 600 controlling the above elements.

In structural view, the LCD according to an embodiment of the present invention includes a LC module 350 including a display unit 330 and a backlight unit 340, as shown in FIG. 2.

The display unit 330 includes the LC panel assembly 300, a plurality of gate flexible printed circuit (FPC) films 410 and a plurality of data FPC films 510 attached to the LC panel assembly 300, and a gate printed circuit board (PCB) 450 and a data PCB 550 attached to the associated FPC films 410 and 510, respectively.

The LC panel assembly 300, in structural view shown in FIGS. 2 and 3, includes a lower panel 100, an upper panel 200 and a liquid crystal layer 3 interposed therebetween while it includes a plurality of display signal lines $G_1$–$G_n$ and $D_1$–$D_m$ and a plurality of pixels connected thereto and arranged substantially in a matrix in circuital view shown in FIGS. 1 and 3.

The display signal lines $G_1$–$G_n$ and $D_1$–$D_m$ are provided on the lower panel 100 and include a plurality of gate lines $G_1$–$G_n$ transmitting gate signals (called scanning signals) and a plurality of data lines $D_1$–$D_m$ transmitting data signals. The gate lines $G_1$–$G_n$ extend substantially in a row direction and are substantially parallel to each other, while the data lines $D_1$–$D_m$ extend substantially in a column direction and are substantially parallel to each other.

Each pixel includes a switching element Q connected to the display signal lines $G_1$–$G_n$ and $D_1$–$D_m$, and an LC capacitor $C_{LC}$ and a storage capacitor $C_{ST}$ that are connected to the switching element Q. The storage capacitor $C_{ST}$ may be omitted if unnecessary.

The switching element Q such as a TFT is provided on the lower panel 100 and has three terminals: a control terminal connected to one of the gate lines $G_1$–$G_n$; an input terminal connected to one of the data lines $D_1$–$D_m$; and an output terminal connected to the LC capacitor $C_{LC}$ and the storage capacitor $C_{ST}$.

The LC capacitor $C_{LC}$ includes a pixel electrode 190 on the lower panel 100, a common electrode 270 on the upper panel 200, and the LC layer 3 as a dielectric between the electrodes 190 and 270. The pixel electrode 190 is connected to the switching element Q, and the common electrode 270 covers the entire surface of the upper panel 100 and is supplied with a common voltage Vcom. Alternatively, both the pixel electrode 190 and the common electrode 270, which have shapes of bars or stripes, are provided on the lower panel 100.

The storage capacitor $C_{ST}$ is an auxiliary capacitor for the LC capacitor $C_{LC}$. The storage capacitor $C_{ST}$ includes the pixel electrode 190 and a separate signal line (not shown), which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel represents its own color by providing one of a plurality of color filters 230 in an area occupied by the pixel electrode 190. The color filter 230 shown in FIG. 3 is provided in the corresponding area of the upper panel 200. Alternatively, the color filter 230 is provided on or under the pixel electrode 190 on the lower panel 100.

Preferably, the color of the color filter 230 is one of the primary colors such as red, green and blue. Hereinafter, a pixel is referred to as red, greed or blue pixel based on the color represented by the pixel and indicated by reference numerals R, G or B.

Referring to FIG. 2, the backlight unit 340 includes a plurality of lamps 341 illuminating light, a light guide 342 and a plurality of optical sheets 343 disposed under the panel assembly 300 and guiding and diffusing light from the lamps 341 to the panel assembly 300, a reflector 344 disposed under the lamps 341 and reflecting the light from the lamps 341 toward the panel assembly 300, and a pair of lamp covers 345 covering the lamps. The lamps 341 and the lamp covers 345 are disposed at lateral sides of the light guide 342.

The lamps 341 are illustrated as the lighting unit 900 and preferably include fluorescent lamps such as CCFL (cold cathode fluorescent lamp) and EEFL (external electrode fluorescent lamp). An LED is another example of the lamp 341.

A pair of polarizers (not shown) polarizing the light from the lamps 341 are attached on the outer surfaces of the panels 100 and 200 of the panel assembly 300.

Figures 4A, 4B:
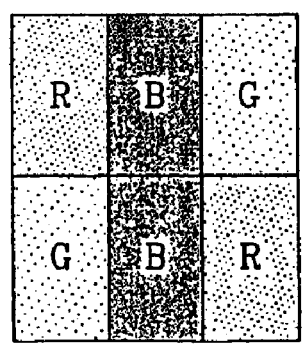
FIGS. 4A and 5A illustrate spatial arrangements of pixels of LCDs according to embodiments of the present invention.
FIGS. 4B and 5B illustrates a group of pixels forming a dot, which is an elementary unit for an image in the pixel arrangements shown in FIGS. 4A and 5A, respectively.
Figures 5A, 5B:
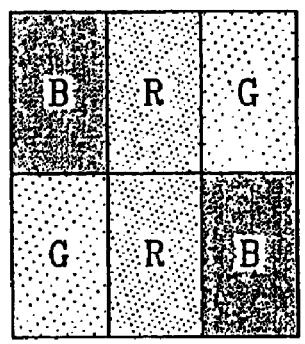

FIGS. 4A and 5A illustrate spatial arrangements of pixels of LCDs according to embodiments of the present invention.

Referring to FIGS. 4A and 5A, a plurality of pixels having substantially equal size are arranged in a matrix including a plurality of pixel row and a plurality of pixel columns.

Each pixel row includes pixels representing three colors, i.e., red pixels R, green pixels G, and blue pixels B. The sequence of the pixels in a pixel row shown in FIG. 4A is the red pixel R, the blue pixel B, and the green pixel G or the green pixel G, the blue pixel B, and the red pixel R. On the contrary, the sequence of the pixels in a pixel row shown in FIG. 5A is the blue pixel B, the red pixel R, and the green pixel G or the green pixel G, the red pixel R, and the blue pixel B.

The pixel columns include a plurality of bicolor columns and a plurality of unicolor columns. As shown in FIG. 4A, each bicolor column includes red pixels R and green pixels G and each unicolor column includes blue pixels B. As shown in FIG. 5A, each bicolor column includes blue pixels B and green pixels G and each unicolor column includes red pixels R.

When viewing only bicolor columns, any two pixels adjacent to each other in a row direction or a column direction represent different colors and thus the bicolor columns form a checkerboard pattern. Each unicolor column is interposed between the bicolor columns.

FIGS. 4B and 5B illustrates a group of pixels forming a dot, which is an elementary unit for an image in the pixel arrangements shown in FIGS. 4A and 5A, respectively.

Each group includes six pixels, i.e., two adjacent center pixels in a unicolor column and four pixels in bicolor columns, which are adjacent to the respective center pixels in the row direction.

An LCD having the above-described pixel arrangement are rendered for increasing resolution and this will be described in detail with reference to FIG. 6.

Figure 6:
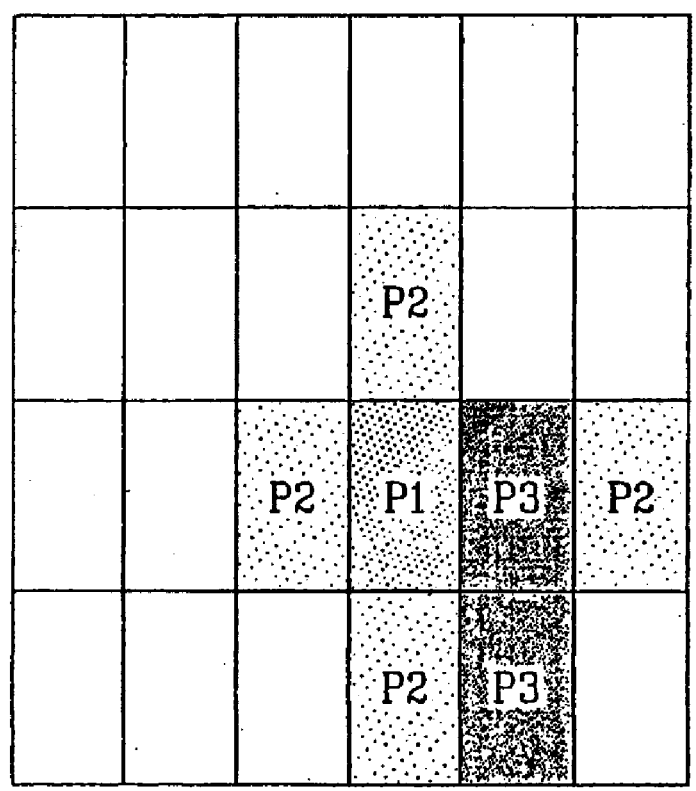
FIG. 6 is an exemplary pixel group for a rendered LCD according to an embodiment of the present invention.

FIG. 6 is an exemplary pixel group for a rendered LCD according to an embodiment of the present invention.

Referring to FIG. 6, an exemplary pixel group for rendering is centered on any pixel P1 in a bicolor pixel. The pixel group includes four pixels P2 in bicolor columns and two pixels in a unicolor column, which are adjacent to the center pixel P1. The rendering may give about half weight to the center pixel P1.

In the meantime, since the pixels representing the same colors in bicolor columns face each other obliquely in a symmetrical manner as shown in FIGS. 4B, 5B and 6 and are seen as mixed. On the contrary, the pixels in unicolor columns are arranged in stripes and do not make symmetry with the pixels in the bicolor columns, which may cause incomplete color mixture and deteriorate image quality. In particular, the bicolor columns shown in FIG. 4B represent green and red, which are mixed to form yellow. Since yellow has luminosity higher than blue, the bicolor columns may be seen brighter than the unicolor columns. On the contrary, blue and green in the bicolor columns shown in FIG. 5B are mixed to form cyan, which has similar luminosity to red, and thus the brightness difference may not be detected.

The brightness difference may be much reduced by differentiating saturation of two pixels in two adjacent red pixels R in a unicolor column shown in FIG. 5B.

For example, the saturation of a red pixel R right to a blue pixel B and left to a green pixel G is lower than that of a red pixel R left to a blue pixel B and right to a green pixel G. The red pixel R right to a relatively dark, blue pixel B has lower saturation but higher luminosity than the blue pixel B, while the red pixel B right to a relatively bright, green pixel G has higher saturation but lower luminosity than the green pixel G. Accordingly, the brightness difference between two adjacent pixels in the row direction and the column direction is reduced.

The saturation difference may be obtained by differentiating the amount of pigment mixed to photoresist to form color filters 230 shown in FIG. 1. However, other methods may be also used for the saturation difference.

An exemplary detailed structure of a TFT array panel for an LCD according to an embodiment of the present invention will be described with reference to FIGS. 7 and 8.

Figure 7:
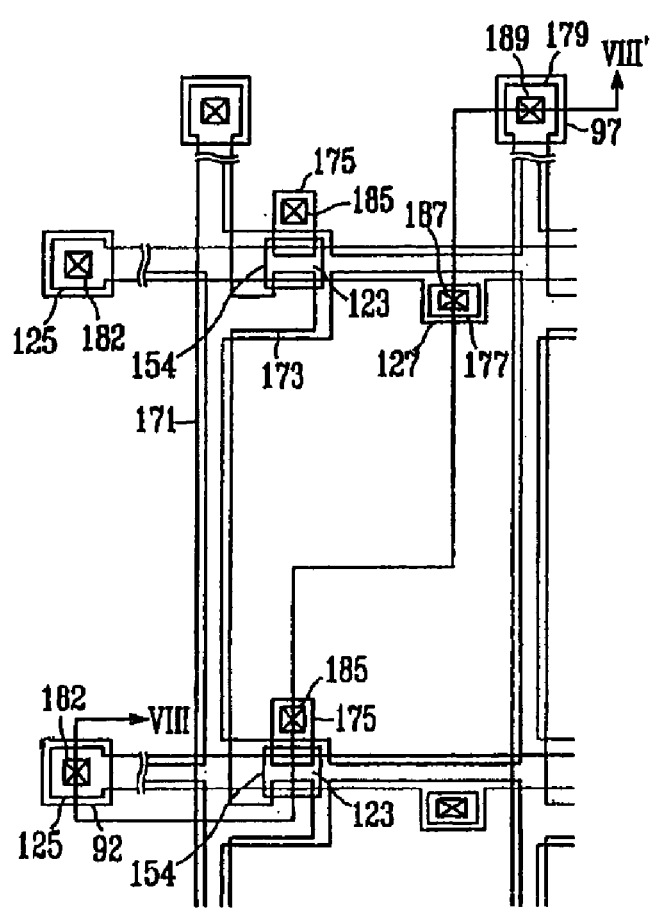
FIG. 7 is a layout view of an exemplary TFT array panel for an LCD according to an embodiment of the present invention.
Figure 8:
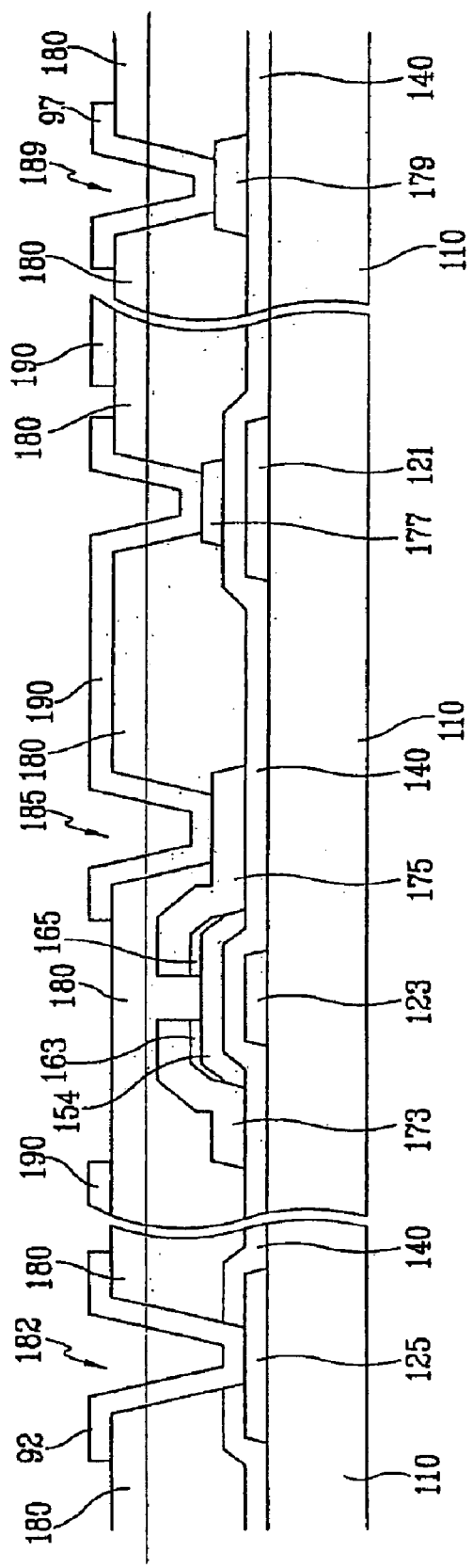
FIG. 8 is a sectional view of the TFT array panel shown in FIG. 7 taken along the line VIII–VIII'.

FIG. 7 is a layout view of an exemplary TFT array panel for an LCD according to an embodiment of the present invention, and FIG. 8 is a sectional view of the TFT array panel shown in FIG. 7 taken along the line VIII–VIII'.

A plurality of gate lines 121 for transmitting gate signals are formed on an insulating substrate 110. Each gate line 121 extends substantially in a transverse direction and a plurality of portions of each gate line 121 form a plurality of gate electrodes 123. Each gate line 121 includes a plurality of expansions 127 protruding downward.

The gate lines 121 include a low resistivity conductive layer preferably made of Ag containing metal such as Ag and Ag alloy or Al containing metal such as Al and Al alloy. The gate lines 121 may have a multilayered structure including a low resistivity conductive layer and another layer preferably made of Cr, Ti, Ta, Mo or their alloys such as MoW alloy having good physical, chemical and electrical contact characteristics with other materials such as ITO (indium tin oxide) and IZO (indium zinc oxide). A good exemplary combination of such layers is Cr and Al—Nd alloy.

The lateral sides of the gate lines 121 are tapered, and the inclination angle of the lateral sides with respect to a surface of the substrate 110 ranges about 30–80 degrees.

A gate insulating layer 140 preferably made of silicon nitride (SiNx) is formed on the gate lines 121.

A plurality of semiconductor islands 154 preferably made of hydrogenated amorphous silicon (abbreviated to "a-Si") are formed on the gate insulating layer 140.

A plurality of ohmic contact islands 163 and 165 preferably made of silicide or n+ hydrogenated a-Si heavily doped with n type impurity are formed on the semiconductor islands 154. The ohmic contact islands 163 and 165 are located in pairs on the semiconductor islands 154.

The lateral sides of the semiconductor islands 154 and the ohmic contacts 163 and 165 are tapered, and the inclination angles thereof are preferably in a range between about 30–80 degrees.

A plurality of data lines 171, a plurality of drain electrodes 175, and a plurality of storage capacitor conductors 177 are formed on the ohmic contacts 163 and 165 and the gate insulating layer 140.

The data lines 171 for transmitting data voltages extend substantially in the longitudinal direction and intersect the gate lines 121. A plurality of branches of each data line 171, which extend toward the drain electrodes 175, form a plurality of source electrodes 173. Each pair of the source electrodes 173 and the drain electrodes 175 are separated from each other and opposite each other with respect to a gate electrode 123. A gate electrode 123, a source electrode 173, and a drain electrode 175 along with a semiconductor island 154 form a TFT having a channel formed in the semiconductor island 154 disposed between the source electrode 173 and the drain electrode 175.

The storage capacitor conductors 177 overlap the expansions 127 of the gate lines 121.

The data lines 171, the drain electrodes 175, and the storage capacitor conductors 177 also include a low resistivity conductive layer preferably made of Ag containing metal such as Ag and Ag alloy or Al containing metal such as Al and Al alloy. The data lines 171, the drain electrodes 175, and the storage capacitor conductors 177 may have a multilayered structure including a low resistivity conductive layer and another layer preferably made of Cr, Ti, Ta, Mo or their alloys such as MoW alloy having good physical, chemical and electrical contact characteristics with other materials such as ITO (indium tin oxide) and IZO (indium zinc oxide). A good exemplary combination of such layers is Cr and Al—Nd alloy.

The lateral sides of the data lines 171, the drain electrodes 175, and the storage capacitor conductors 177 are tapered, and the inclination angle of the lateral sides with respect to a surface of the substrate 110 ranges about 30–80 degrees.

The ohmic contacts 163 and 165 interposed only between the underlying semiconductor islands 154 and the overlying data lines 171 and the overlying drain electrodes 175 thereon and reduce the contact resistance therebetween.

A passivation layer 180 is formed on the data lines 171, the drain electrodes 175, the storage conductors 177, and the exposed portions of the semiconductor islands 154. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride. Alternatively, the passivation layer 180 may includes both a SiNX film and an organic film.

The passivation layer 180 has a plurality of contact holes 185, 187 and 189 exposing the drain electrodes 175, the storage conductors 177, and end portions 179 of the data lines 171, respectively. The passivation layer 180 and the gate insulating layer 140 has a plurality of contact holes 182 exposing end portions 125 of the gate lines 121.

A plurality of pixel electrodes 190 and a plurality of contact assistants 92 and 97, which are preferably made of IZO or ITO, are formed on the passivation layer 180.

The pixel electrodes 190 are physically and electrically connected to the drain electrodes 175 through the contact holes 185 and to the storage capacitor conductors 177 through the contact holes 187 such that the pixel electrodes 190 receives the data voltages from the drain electrodes 175 and transmits the received data voltages to the storage capacitor conductors 177.

Referring back to FIG. 3, the pixel electrodes 190 supplied with the data voltages generate electric fields in cooperation with the common electrode 270 on the other panel 200, which reorient liquid crystal molecules in the liquid crystal layer 3 disposed therebetween.

As described above, a pixel electrode 190 and a common electrode 270 form a liquid crystal capacitor $C_{LC}$, which stores applied voltages after turn-off of the TFT Q. An additional capacitor called a "storage capacitor," which is connected in parallel to the liquid crystal capacitor $C_{LC}$, is provided for enhancing the voltage storing capacity. The storage capacitors are implemented by overlapping the pixel electrodes 190 with the gate lines 121 adjacent thereto (called "previous gate lines"). The capacitances of the storage capacitors, i.e., the storage capacitances are increased by providing the expansions 127 at the gate lines 121 for increasing overlapping areas and by providing the storage capacitor conductors 177, which are connected to the pixel electrodes 190 and overlap the expansions 127, under the pixel electrodes 190 for decreasing the distance between the terminals.

The pixel electrodes 190 overlap the gate lines 121 and the data lines 171 to increase aperture ratio but it is optional.

The contact assistants 92 and 97 are connected to the exposed end portions 125 of the gate lines 121 and the exposed end portions 179 of the data lines 171 through the contact holes 182 and 189, respectively. The contact assistants 92 and 97 are not requisites but preferred to protect the exposed portions 125 and 179 and to complement the adhesiveness of the exposed portion 125 and 179 and external devices.

According to another embodiment of the present invention, the pixel electrodes 190 are made of transparent conductive polymer. For a reflective or transflective LCD, the pixel electrodes 190 include opaque reflective metal.

A TFT array panel for an LCD according to another embodiment of the present invention will be described in detail with reference to FIGS. 9, 10A and 10B.

Figure 9:
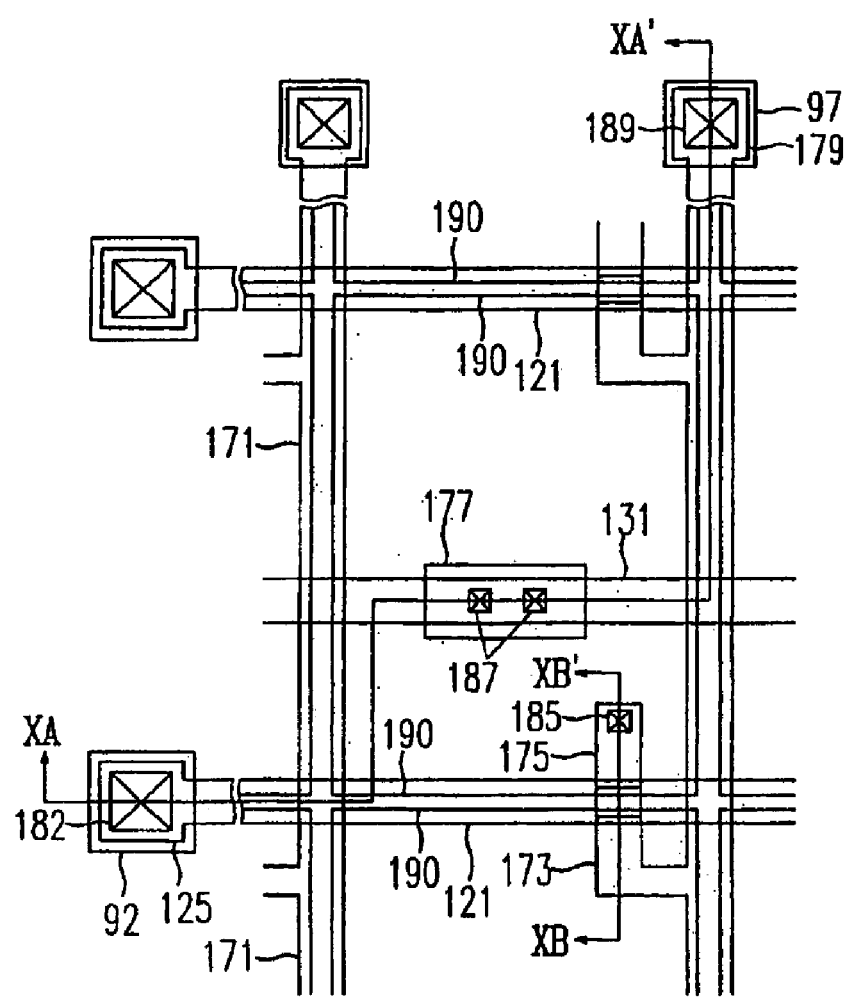
FIG. 9 is a layout view of an exemplary TFT array panel for an LCD according to another embodiment of the present invention.
Figure 10A:
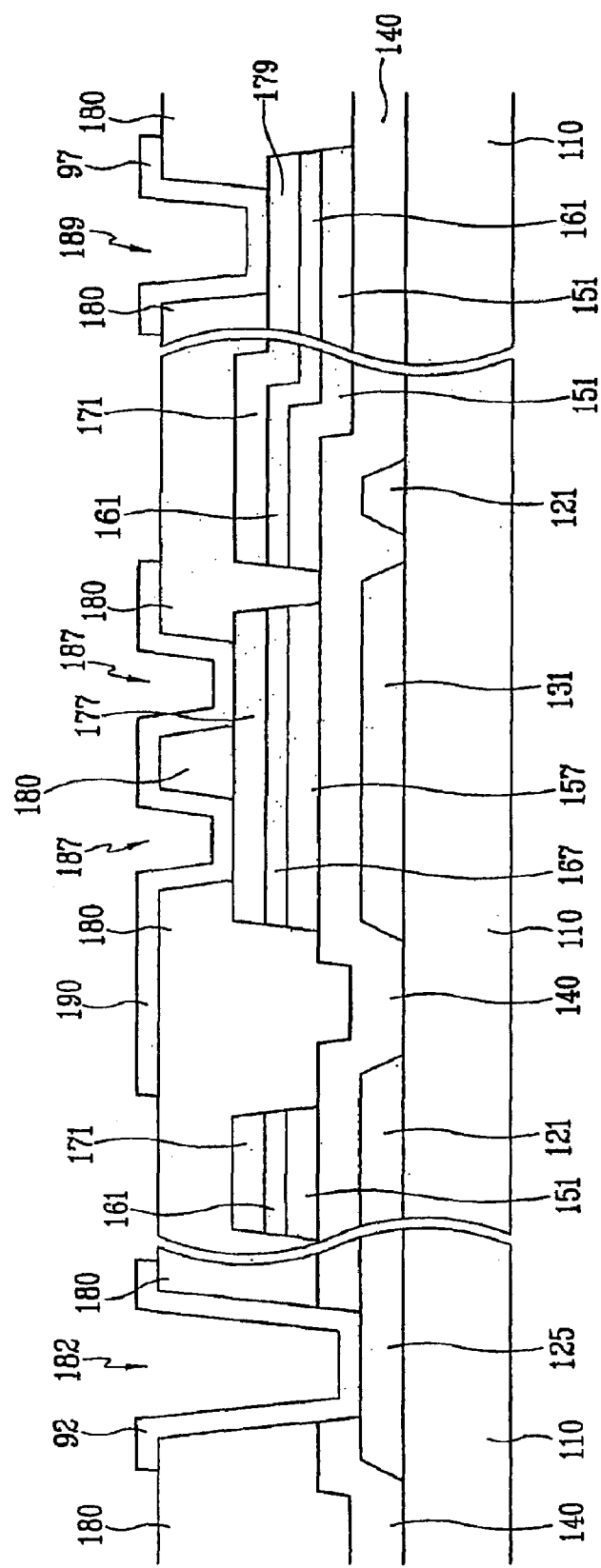
FIGS. 10A and 10B are sectional views of the TFT array panel shown in FIG. 9 taken along the line XA–XA' and the line XB–XB', respectively.
Figure 10B:
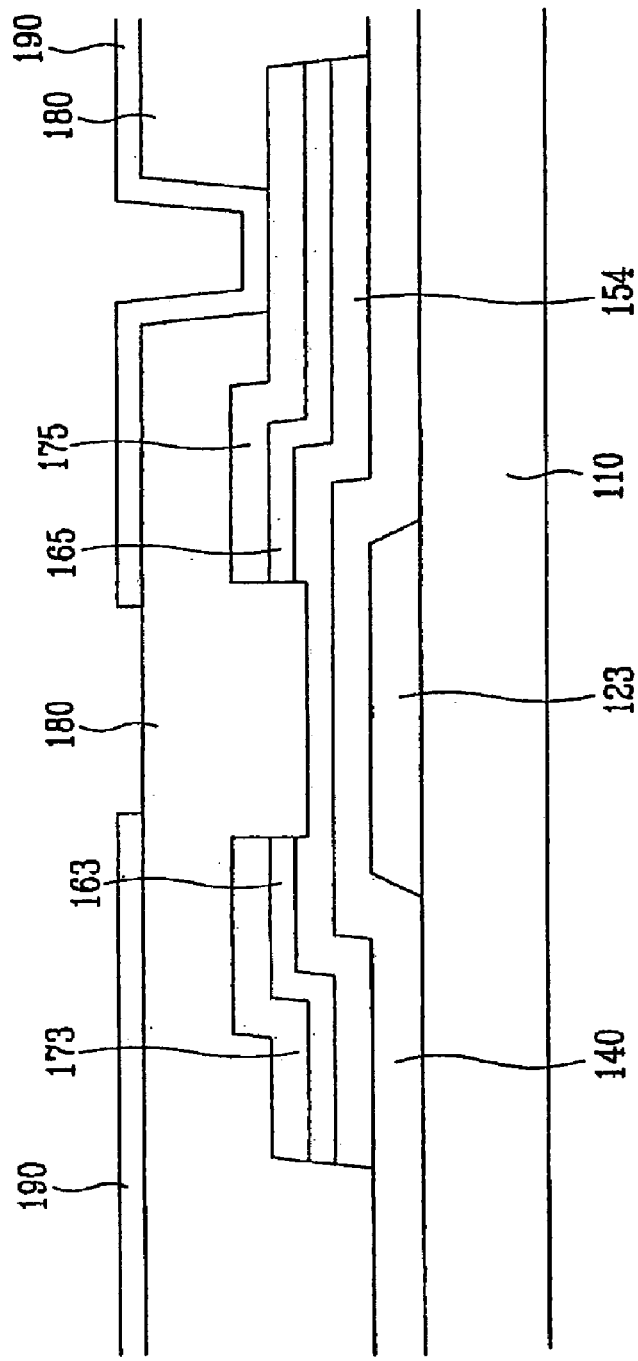

FIG. 9 is a layout view of an exemplary TFT array panel for an LCD according to another embodiment of the present invention, and FIGS. 10A and 10B are sectional views of the TFT array panel shown in FIG. 9 taken along the line XA–XA' and the line XB–XB', respectively.

As shown in the figures, a layered structure of a TFT array panel of an LCD according to this embodiment is almost the same as that shown in FIGS. 7 and 8. That is, a plurality of gate lines 121 including a plurality of gate electrodes 123 are formed on a substrate 110, and a gate insulating layer 140 is formed thereon. A plurality of semiconductor stripes 151 including a plurality of extensions 154 corresponding to the semiconductor islands 154 shown in FIGS. 7 and 8 are formed on the gate insulating layer 140, and a plurality of ohmic contact stripes 161 including a plurality of extensions 163 corresponding to the ohmic contact islands 163 shown in FIGS. 7 and 8 and a plurality of ohmic contact islands 165 are formed on the semiconductor stripes 151. A plurality of data lines 171 including a plurality of source electrodes 173, a plurality of drain electrodes 175, and a plurality of storage capacitor conductors 177 are formed on the ohmic contacts 161 and 165, and a passivation layer 180 is formed thereon. A plurality of contact holes 182, 185, 187 and 189 are provided at the passivation layer 180 and/or the gate insulating layer 140, and a plurality of pixel electrodes 190 and a plurality of contact assistants 92 and 97 are formed on the passivation layer 180.

Different from the TFT array panel shown in FIGS. 7 and 8, the TFT array panel according to this embodiment provides a plurality of storage electrode lines 131, which are separated from the gate lines 121, on the same layer as the gate lines 121, and overlaps the storage electrode lines 131 with the storage capacitor conductors 177 to form storage capacitors without expansions of the gate lines 121. The storage electrode lines 131 are supplied with a predetermined voltage such as the common voltage. The storage electrode lines 131 along with the storage capacitor conductors 177 may be omitted if the storage capacitance generated by the overlapping of the gate lines 121 and the pixel electrodes 190 is sufficient.

In addition, as well as the semiconductor stripes 151 and the ohmic contacts 161 and 165, a plurality of semiconductor islands 157 and a plurality of ohmic contacts 167 thereover are provided between the storage conductors 177 and the gate insulating layer 140.

The semiconductor stripes and islands 151 and 157 have almost the same planar shapes as the data lines 171, the drain electrodes 175 and the storage capacitor conductors 177 as well as the underlying ohmic contacts 161, 165 and 167, except for the extensions 154 where TFTs are provided. In particular, the semiconductor islands 157, the ohmic contact islands 167 and the storage conductors 177 have substantially the same planar shape. The semiconductor stripes 151 include some exposed portions, which are not covered with the data lines 171, the drain electrodes 175 and the storage conductors 177, such as portions located between the source electrodes 173 and the drain electrodes 175.

FIG. 11 is a sectional view of an LCD according to another embodiment of the present invention, and FIGS. 12 to 15 illustrate pixel arrangements of LCDs according to embodiments of the present invention.

As shown in FIG. 11, an LCD according to another embodiment of the present invention includes a lower panel 100, an upper panel 200 facing the lower panel 200, and a liquid crystal layer 3 interposed between the lower and the upper panels and containing liquid crystal molecules aligned in a predetermined direction. The LCD further includes upper and lower polarizers 12 and 22, and upper and lower compensation films 13 and 23. The liquid crystal molecules vary in their orientations under the application of electric fields. The transmittance of the light is changed depending upon the orientations of the liquid crystal molecules.

The lower panel 100 includes a lower substrate 110 preferably made of a transparent insulating material such as glass, a plurality of thin film transistors TFT formed on the lower substrate 110, and a plurality of pixel electrodes 190 connected to the TFTs and preferably made of a transparent conductive material such as ITO and IZO. Each TFT switches data voltages applied to the pixel electrode 190.

The lower compensation film 13 and the lower polarizer 12 are attached to the outer surface of the lower substrate 110. The lower compensation film 13 has biaxiality or uniaxiality. The lower compensation film 13 may be omitted.

The upper panel 200 includes an upper substrate 210 preferably made of a transparent insulating material such as glass, a black matrix 220 defining a plurality of pixel areas arranged in a matrix, a plurality of red, green and blue color filters 230R, 230G and 230B formed in the pixel areas defined by the black matrix 220, and a common electrode 270 preferably made of a transparent conductive material such as ITO and IZO.

The red, green and blue color filters 230R, 230G and 230B are arranged in turn. The pixel areas without any of the red, green and blue color filters 230R, 230G and 230B represent white pixel areas W, which equally intercept or pass all the components of incident light. Since the white pixel area W has no color filter, the inner surface of the color filter panel 200 on the white pixel area W has smaller height than on the other pixel areas R, G and B and the cell gap of the white pixel area W is larger than that at the other pixel areas.

In this specification, the term "pixel" indicates a basic functional element for displaying images, which includes a pixel electrode 190, a portion of the common electrode 270 opposite the pixel electrode 190, a portion of the liquid crystal layer 3 located between the pixel electrode 190 and the corresponding portion of the common electrode 270, a TFT, and a color filter 230R, 230G or 230B. In addition, the term "pixel area" means the area occupied by a pixel. However, for convenience of description, the two terms "pixel" and "pixel area" will not be distinctly used in this specification.

Figure 12:
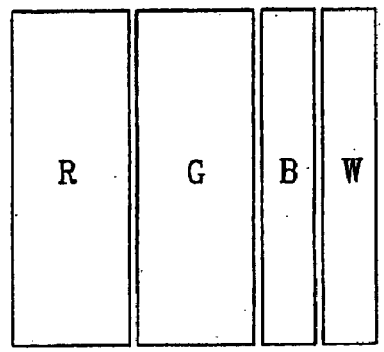
FIGS. 12 to 15 illustrate pixel arrangements of LCDs according to embodiments of the present invention.

Referring to FIG. 12, the numbers of the red, green, blue and white pixels areas R, G, B and W are the same. The red, green, blue and white pixel areas R, G, B and W are arranged in turn along the row direction. Each of the blue pixel areas B and the white pixel areas W has a size equal to about half of each of the red pixel areas R and the green pixel areas G. Therefore, the sum of one white pixel area W and one blue pixel area B is nearly the same as one red pixel area R or one green pixel area G.

Figure 13:
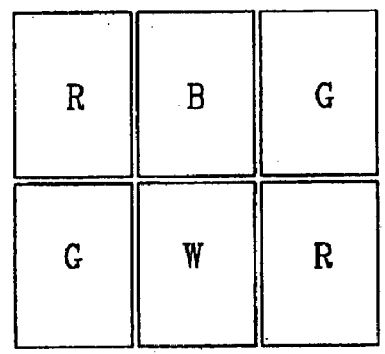

Referring to FIG. 13, a 2×3 pixel matrix including identical pixels forms a dot which is a basic element of an image. The first pixel row includes red, blue and green pixels arranged in sequence, and the second pixel row includes green, white and red pixels arranged in sequence.

Figure 14:
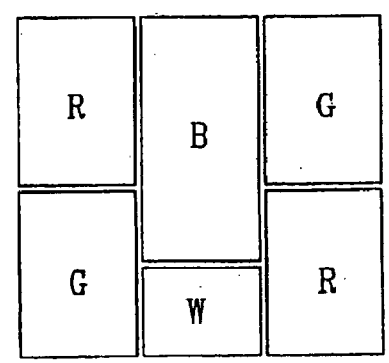

The arrangement of the pixels shown in FIG. 14 is almost the same as that shown in FIG. 13 except that the blue pixel B is enlarged, while the white pixel W is reduced.

Figure 15:
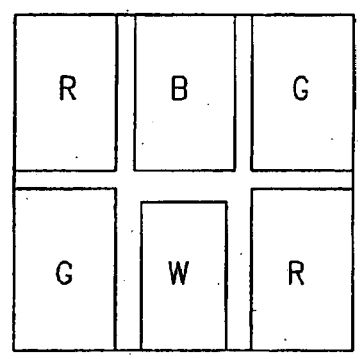

The pixel arrangement shown in FIG. 15 is almost the same as that shown in FIG. 13 except that portions of the black matrix BM surrounding the white pixel W is enlarged to have a width wider than other portions, which is established to hide the disclination lines generated due to the height difference.

The upper compensation film 23 and the upper polarizer 22 are attached to the outer surface of the upper substrate 210. The upper compensation film 23 has biaxiality or uniaxiality. The upper compensation film 23 may be omitted.

Since the color filter 230R, 230G and 230B transmits one thirds of incident light the light transmittance of a white pixel is about three times that of other color pixels. In this embodiment, since one dot includes red, green, blue and white pixels, the optical efficiency is improved without increasing the total area of the dot.

Assume that the amount of the light passing through the lower polarizer 12 is one.

For a dot including three pixels, i.e., red, green and blue pixels, the area of each pixel is one thirds of the total area of the dot. Since the light transmittance of the color filter is one thirds, the total light transmittance of the dot is equal to $1/3 \times 1/3 + 1/3 \times 1/3 + 1/3 \times 1/3 = 1/3 \approx 33.3\%$.

For a dot shown in FIG. 12, the area of each of red and green pixels is one thirds of the total area, while the area of each of blue and white pixels is one sixths of the total area. Since the light transmittance of the white pixel is one, while that of the other pixels is one thirds, the total light transmittance of the dot equals to $1/3 \times 1/3 + 1/3 \times 1/3 + 1/6 \times 1/3 + 1/6 \times 1 = 4/9 \approx 44.4\%$. Accordingly, the brightness is increased to be about 1.5 times compared with a three-color LCD.

Although the area of the blue pixel is smaller than the red pixel or the green pixel, the variation of the amount of the blue light is relatively insensitive to a person compared with red and green light, and hence, the influence of the areal reduction on the image quality is relatively small.

However, the areal reduction of the blue pixel gives slight deformation in the images, that is, it makes the images yellowish.

In order to solve such a problem, the light source 341 emits a light with increased blue component to prevent yellowish images.

The light emitted from the light source 341 of the backlight unit 340 shown in FIG. 2 has a color coordinate (x, y) where x ranges from about 0.31 to about 0.34 and y ranges from about 0.32 to about 0.35. Such a light contains the blue component more than the light emitted from a light source for a conventional LCD backlight. In order to obtain such a light source, the blue color emitting material to be contained in the light source 341 should be increased by a predetermined amount.

Figure 16:
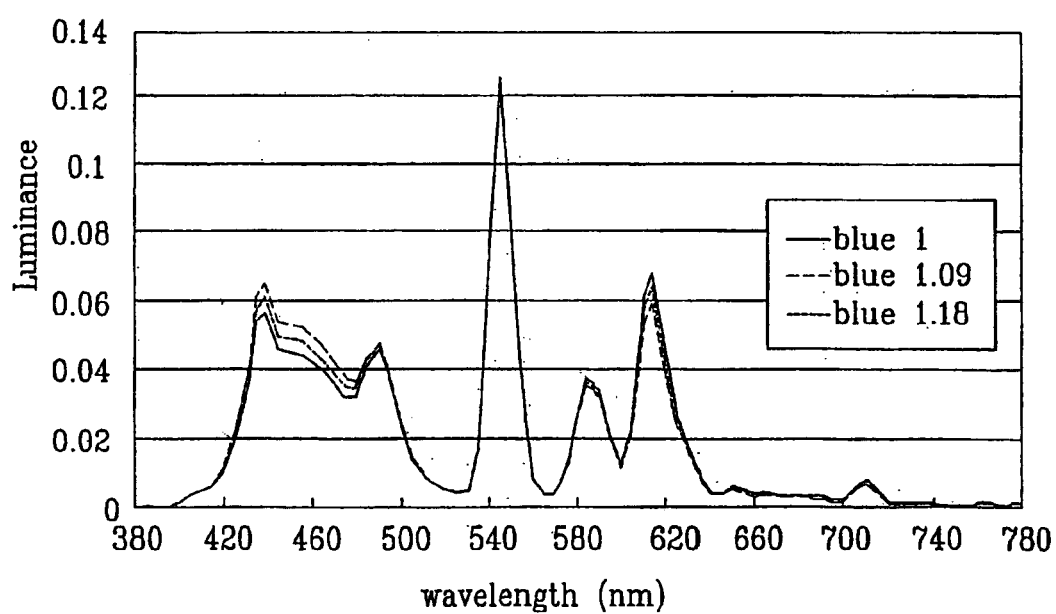
FIG. 16 is a graph showing an exemplary light spectrum of a light source according to an embodiment of the present invention.

FIG. 16 is a graph showing an exemplary light spectrum of a light source according to an embodiment of the present invention. Compared with the curve for a conventional light source represented by "blue 1", the curves represented by "blue 1.09" and "blue 1.18" show enhanced peaks at wavelength in a range of about 440–470 nm, which indicates blue light, and decreased peaks at wavelength in a range of about 620–650 nm, which indicates red light.

Meanwhile, since the white pixel W has no color filter, the light out of the white pixel W from the light source 531 may look bluish. However, the larger cell gap of the white pixel W, which makes the incident light yellowish, prevents the light from being bluish.

Figure 17:
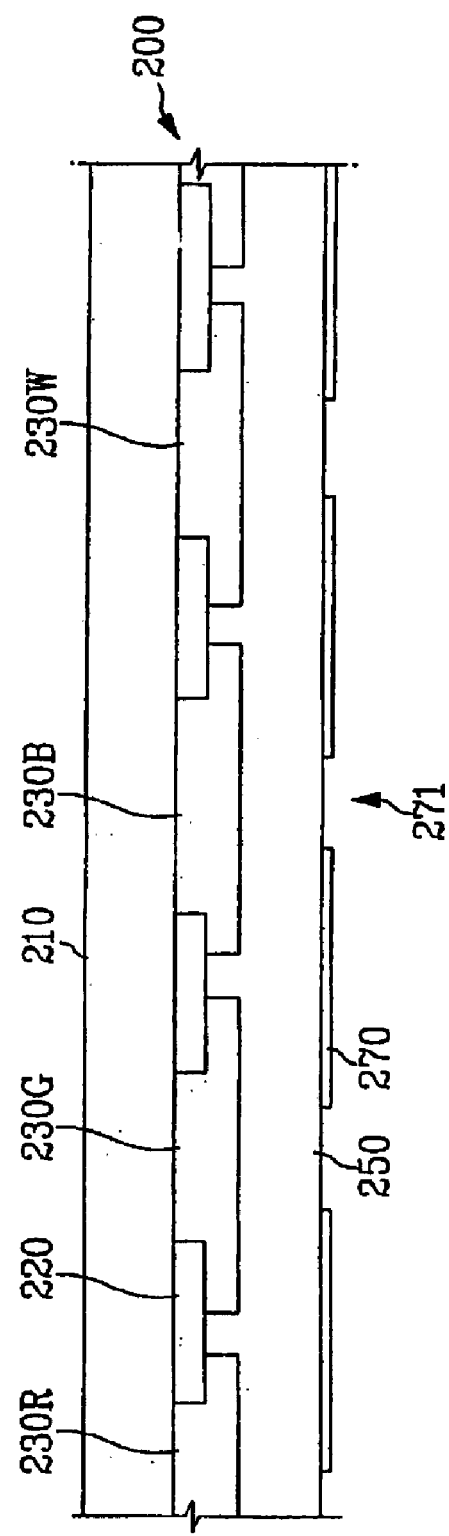
FIGS. 17 and 18 are sectional views of color filter array panels for an LCD according to other embodiments of the present invention.
Figure 18:
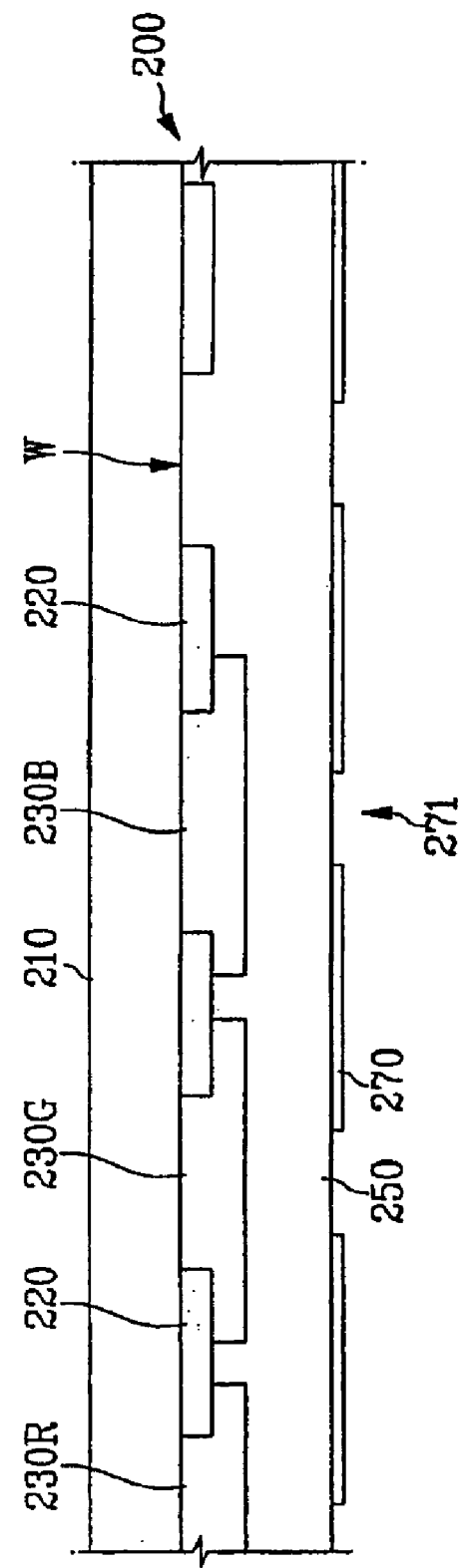

FIGS. 17 and 18 are sectional views of color filter array panels for an LCD according to other embodiments of the present invention.

Referring to FIG. 17, a color filter array panel 200 includes a transparent insulating substrate 210, a black matrix 220 formed on the insulating substrate 210 having a plurality of apertures defining pixel areas, a plurality of red, green, blue and transparent color filters 230R, 230G, 230B and 230W formed in respective pixel areas, an overcoat 250 formed on the color filters 230R, 230G, 230B and 230W, and a common electrode 270 formed on the overcoat 250. It is preferable that the transparent color filters 230W include a transparent organic material such as a photosensitive material without pigment.

A color filter array panel 200 shown in FIG. 18 includes no transparent color filter.

Instead, portions of an overcoat 250 in white pixel areas W have larger thickness than other portions thereof to make the height difference of the surface equal to or less than about 0.0.2 microns. Accordingly, the cell gap for all pixels is nearly uniform, and the color filter array panel 200 is manufactured by relatively simple process compared with that shown in FIG. 17 since the step of forming a transparent color filter 230W is omitted.

The color filter array panels 200 shown in FIGS. 17 and 18 reduces step difference between the white pixels W and the other pixels R, G and B by providing the transparent color filters 230W or by increasing the thickness of the overcoat 250 at the white pixels W.

The reduced step difference and the uniform cell gap prevent the yellowish light of the white pixel W and the discilnation lines at the steps.

Preferably, the cell gap or the thickness of the liquid crystal layer is equal to about 3.7 microns and the thickness of the color filters is about 1.5 to 1.6 microns.

Figure 19:
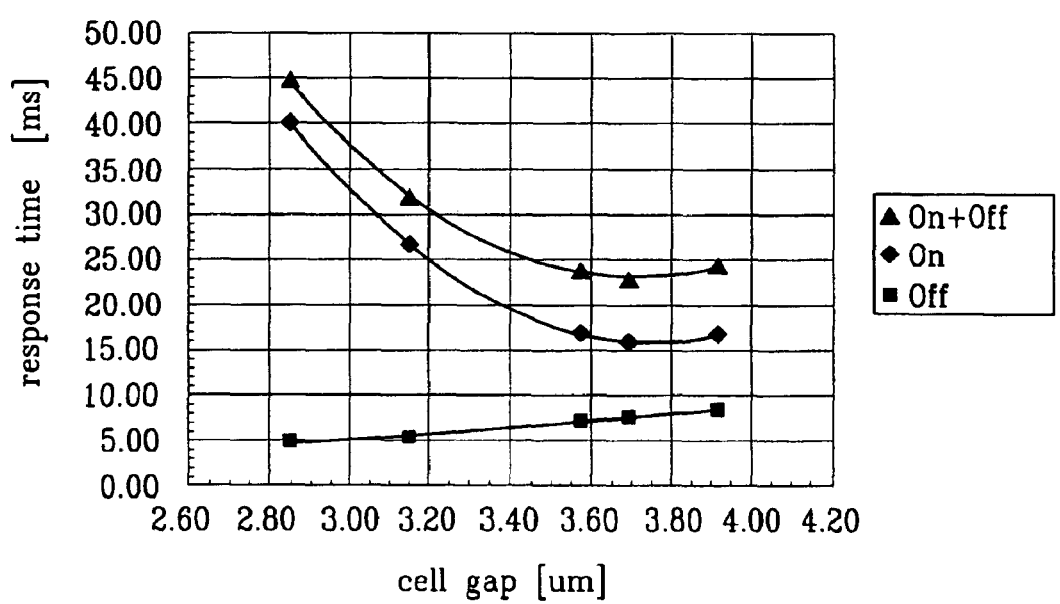
FIG. 19 is a graph illustrating the response time as a function of the cell gap of an LCD.

FIG. 19 is a graph illustrating the response time as a function of the cell gap of an LCD.

As shown in FIG. 19, the response time become reduced as the increase of the cell gap. When the cell gap reaches about 3.7 microns, the response time has a minimum value. As the cell gap goes away from 3.7 microns, the response time becomes increased again.

Figure 20:
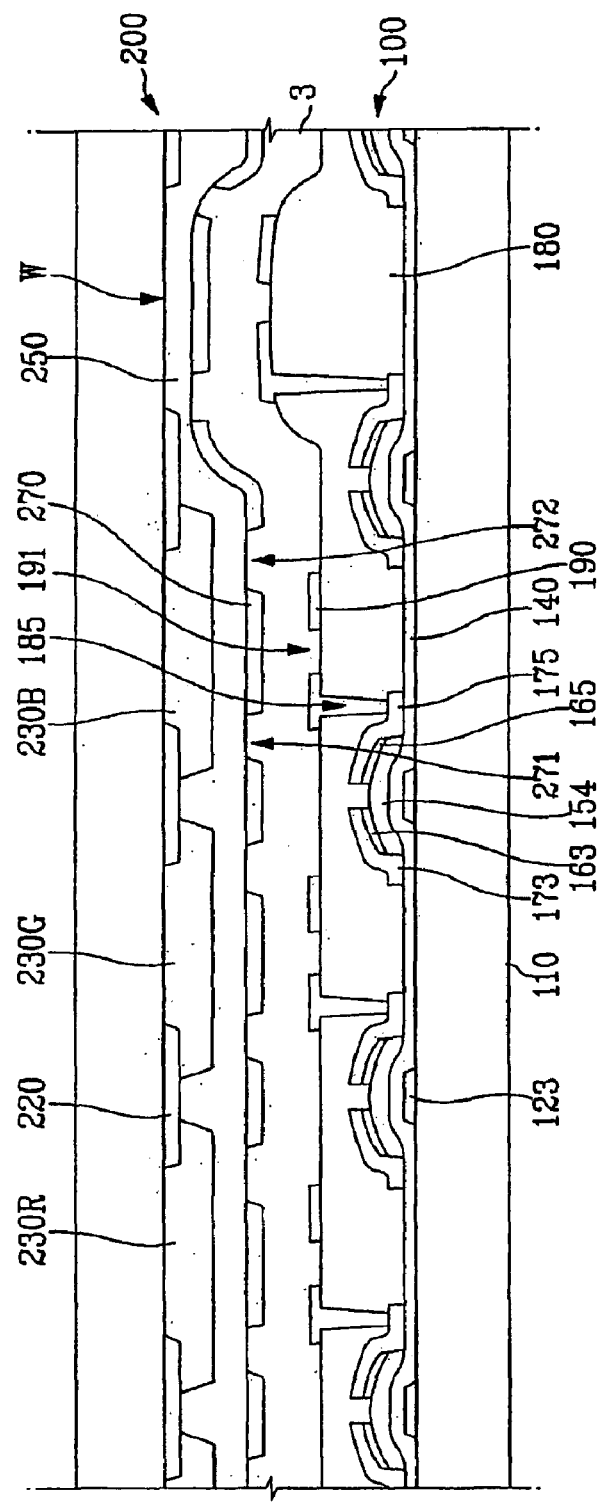
FIG. 20 is a sectional view of an LCD according to another embodiment of the present invention.

FIG. 20 is a sectional view of an LCD according to another embodiment of the present invention.

Referring to FIG. 20, an LCD according to this embodiment includes a TFT array panel 100, a color filter array panel 200, and a liquid crystal layer 3 interposed therebetween.

The color filter array panel 200 includes an upper panel 210 preferably made of a transparent insulating material such as glass, a black matrix 220 formed on the upper panel 210 and defining a plurality of pixel areas arranged in a matrix, a plurality of red, green and blue color filters 230R, 230G and 230B disposed substantially in the pixel areas, an overcoat 250 formed on the color filters 230R, 230G and 230B, and a common electrode 270 preferably made of a transparent conductive material such as ITO and IZO and having a plurality of cutouts 271.

The red, green and blue color filters 230R, 230G and 230B are arranged in turn. The pixel areas without any of the red, green and blue color filters 230R, 230G and 230B represent white pixel areas W, which equally intercept or pass all the components of incident light. Since the white pixel area W has no color filter, the inner surface of the color filter panel 200 on the white pixel area W form a basin.

The TFT array panel 100 may have a structure shown in FIGS. 5 and 6. That is the TFT array panel 100 includes a plurality of gate electrodes 123 formed on an insulating substrate 110, a gate insulating layer 140 formed on the gate electrodes 123, a plurality of semiconductors 154 preferably made of amorphous silicon formed on the gate insulating layer 140 opposite the gate electrodes 123, a plurality of ohmic contacts 163 and 165 formed on the semiconductors 154, a plurality of source and drain electrodes 173 and 175 respectively formed on the ohmic contacts 163 and 165, a protective layer 180 covering the source and the drain electrodes 173 and 175 and having a plurality of contact holes 181 exposing the drain electrodes 175, and a plurality of pixel electrodes connected to the drain electrodes 175 through the contact holes 181 and having a plurality of cutouts 191.

The surface of the protective layer 180 is protruded at the white pixel W to form a plateau.

The basins of the color filter array panel and the plateaus of the TFT array panel face each other such that the white pixels W have nearly the same cell gap as the other pixels.

The above-described protective layer 180 is formed by photolithography with a photo mask having a translucent area as well as a transparent area and an opaque area. After depositing the protective layer 180 and coating a photoresist film thereon, the photo mask is aligned such that the transparent area and the opaque area face the contact hole 181 and the white pixel area W, while the translucent area faces remaining areas. After exposure and development, a portion of the photoresist film on the contact hole 180 is removed to expose a portion of the protective layer 180, a portion on the white pixel area W is left over, and the other portions have reduced thickness. The contact hole 181 is formed by etching using the photoresist film as an etching mask, and the photoresist film suffers ashing such that the portions of the photoresist film with reduced thickness is removed to expose portions of the protective layer 180. Consequently, the photoresist film is left over only on the white pixel area W. The protective layer 180 is etched using the photoresist film as an etching mask such that the exposed portions of the protective layer 180 are thinned to form a plateau on the white pixel area W.

Meanwhile, a plurality of photolithography steps are introduced in manufacturing the TFT array panel 100, and the use of a photo mask having translucent areas as well as transparent and opaque areas reduce the number of photolithography steps. Several layers having different patterns can be made by using a photoresist film having position-dependent thickness made by using the photo mask. For instance, the semiconductors 154, the ohmic contacts 163 and 165, and the source and the drain electrodes 163 and 165 are formed by using such a photoresist film, and thus, the TFT array panel 100 can be completed using less masks compared with the case using photo masks having only transparent and opaque areas. In this case, the source and the drain electrodes 163 and 165, and the ohmic contacts have substantially the same planar shape, and the semiconductors 154 except for the channel region has substantially the same planar shape as the source and the drain electrodes 163 and 165.

The TFT array panel 100 and the color filter array panel 200 are aligned to be assembled. Thereafter, a liquid crystal material 3 is injected into a gap between the panels 100 and 200 and subject to vertical alignment. A pixel region, which indicates a portion of the liquid crystal layer 3 in a pixel, is partitioned into a plurality of domains by the cutouts 191 and 271 of the pixel electrode 190 and the common electrode 270. The domains are classified into four kinds depending upon the tilt directions of the liquid crystal molecules therein upon application of electric field. The several kinds of the domains give wide viewing angle.

Figure 21:
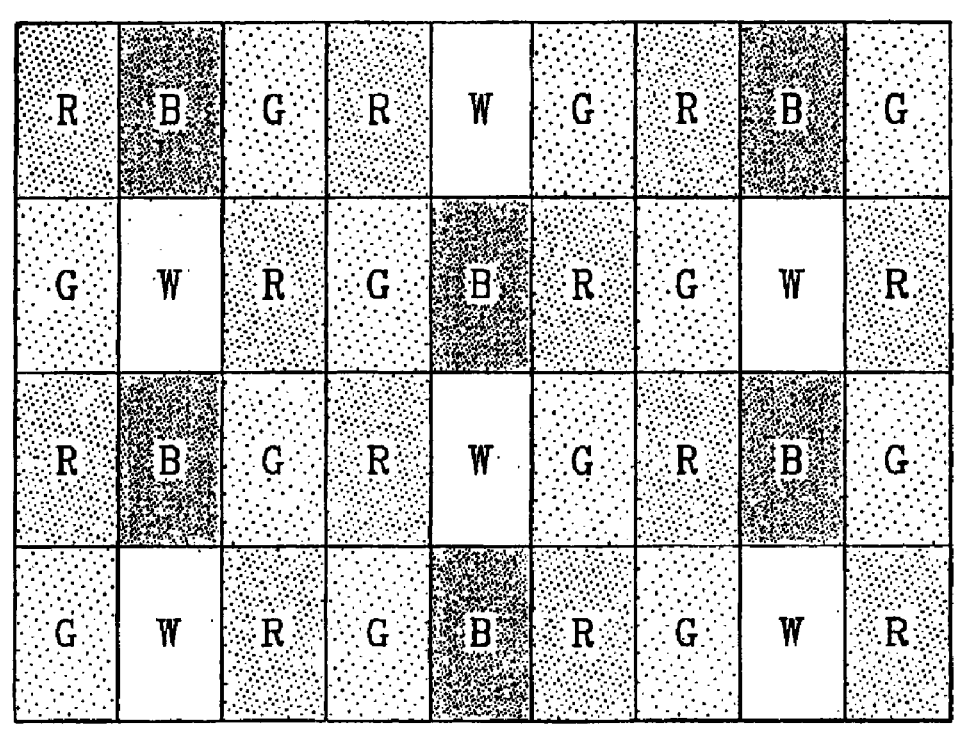
Figure 22:
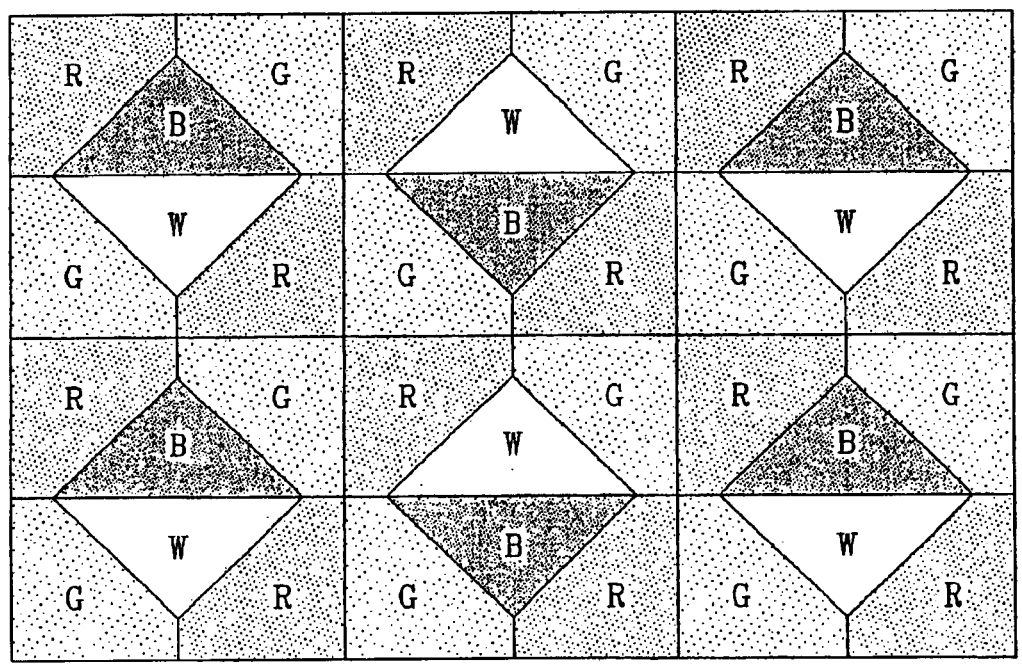
Figure 23:
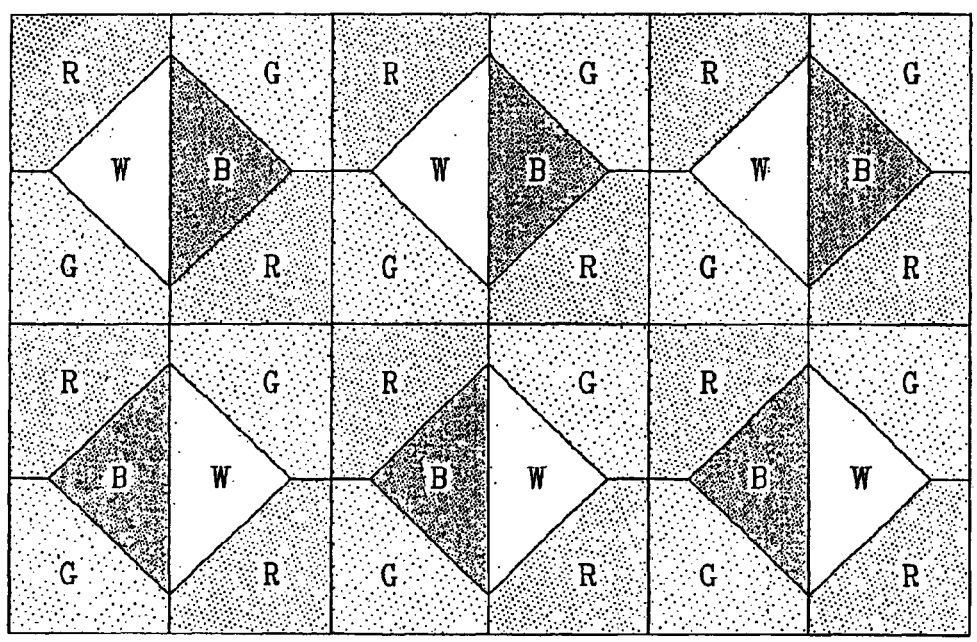

FIGS. 21 to 23 illustrate pixel arrangements for an LCD according to other embodiments of the present invention.

Referring to FIGS. 21 to 23, an LCD according to this embodiment includes red, blue and green pixels R, B and G arranged like a PenTile Matrix and white pixels W adjacent to the blue pixels B.

For a descriptive purpose, it is considered a set of pixels including blue and white pixels B and W adjacent to each other, a pair of red pixels R obliquely facing each other across the blue and the white pixels B and W, and a pair of green pixels G obliquely facing each other across the blue and the white pixels B and W and adjacent to the red pixels R. Then, the pixel arrangements shown in FIGS. 21 to 23 are obtained by repeatedly arranging such sets of pixels. It is noted that the relative positions of the blue pixel B and the white pixel W in two sets of pixels adjacent in a column direction or in a row direction are reversed.

The blue pixel B and the white pixel W shown in FIG. 21 have rectangular shapes as the red and the green pixels R and G and are arranged in the column direction to form a separate column.

Alternatively, the blue pixel B and the white pixel W shown in FIGS. 22 and 23 have isosceles triangular shapes, and a pair of the blue and the white pixels B and W face their bottom sides to form a diamond shape. The blue and the white pixels B and W shown in FIG. 22 are arranged in the column direction, while those shown in FIG. 23 are arranged in a row direction. Accordingly, a boundary line between the blue pixel B and the white pixel W shown in FIG. 22 match the boundary line between the pixel rows, while a boundary line between the blue pixel B and the white pixel W shown in FIG. 23 match the boundary line between the pixel columns.

Referring to FIGS. 21 and 22, the relative positions of the blue pixel B and the white pixel W in two sets of pixels adjacent in the row direction are reversed. However, referring to FIG. 23, the relative positions of the blue pixel B and the white pixel W in two sets of pixels adjacent in the column direction are reversed.

In this arrangement, the red pixels R in adjacent two columns are located in different rows, while those in adjacent rows are located in different columns. Likewise, the green pixels in adjacent two columns are placed in different rows, while those in adjacent rows are located in different columns. In addition, the blue pixels B or the white pixels W in two sets adjacent in the row direction are located in different rows as shown in FIGS. 21 and 22, or alternatively, the blue pixels B or the white pixels W in two sets adjacent in the column direction are located in different columns as shown in FIG. 23. Accordingly, the same color pixels, particularly the blue pixels are arranged in zigzag along the column direction and the row direction.

A dot for displaying an image preferably includes an above-described set of pixels including a pair of blue and white pixels B and W, a pair of red pixels R, and a pair of green pixels G.

However, when using rendering, a dot may include a pair of blue and white pixels B and W and a pair of red and green pixels in a column.

In any cases, these pixel arrangements prevent vertical line pattern generated in a three color LCD where the same color pixels such as blue pixels are arranged in the column direction and the resolution is not sufficiently high. Therefore, an LCD having a PenTile Matrix pixel arrangement realizes improved image quality.

Figure 24:
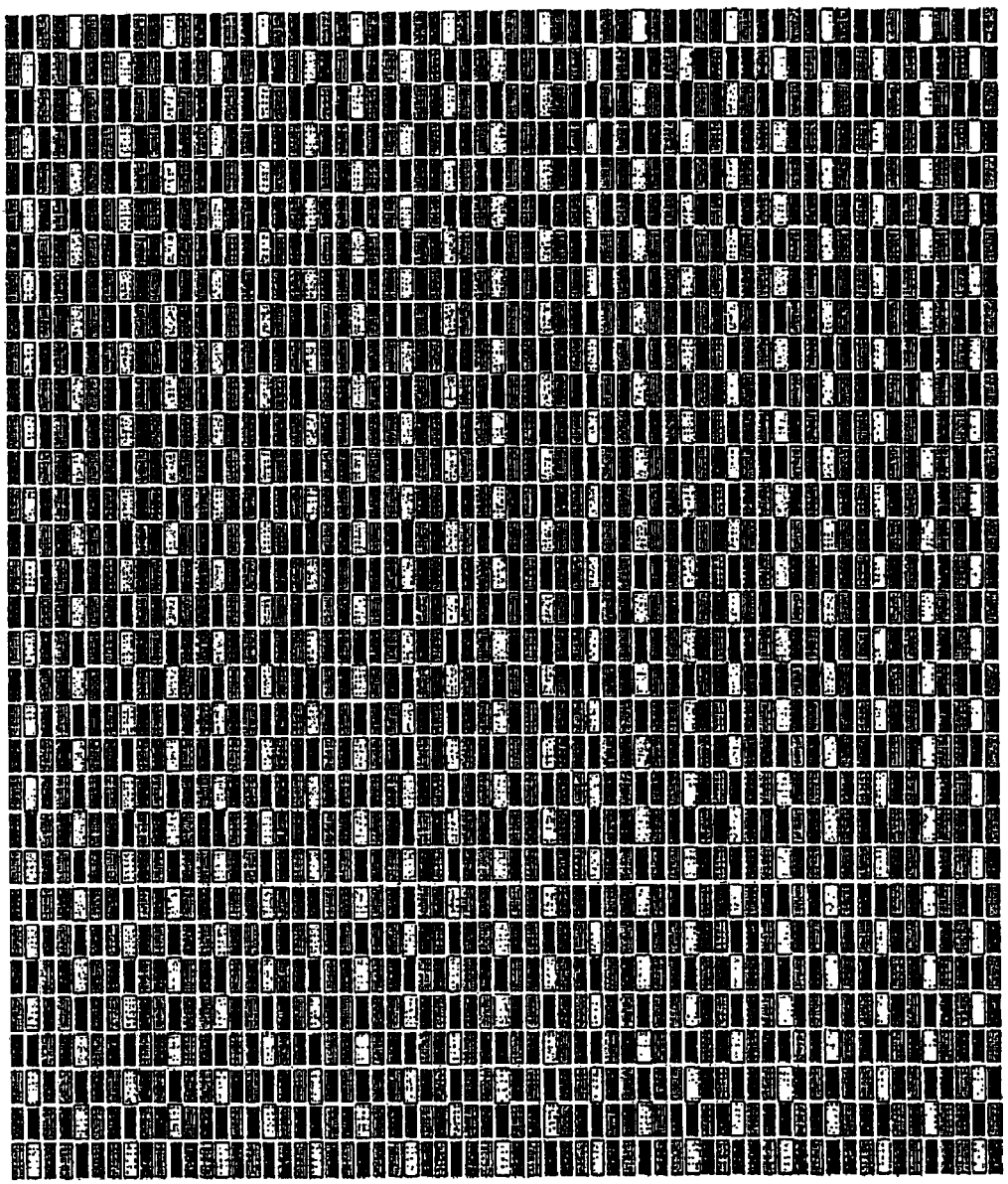
FIG. 24 is a picture for illustrating the visibility of an LCD having the pixel arrangement shown in FIG. 21.

FIG. 24 is a picture for illustrating the visibility of an LCD having the pixel arrangement shown in FIG. 21. As shown in FIG. 24, no vertical line pattern is recognizable.

Exemplary TFT array panels for an LCD having the pixel arrangements shown in FIGS. 21 and 22 will be now described with reference to FIGS. 25 and 26.

Figure 25:
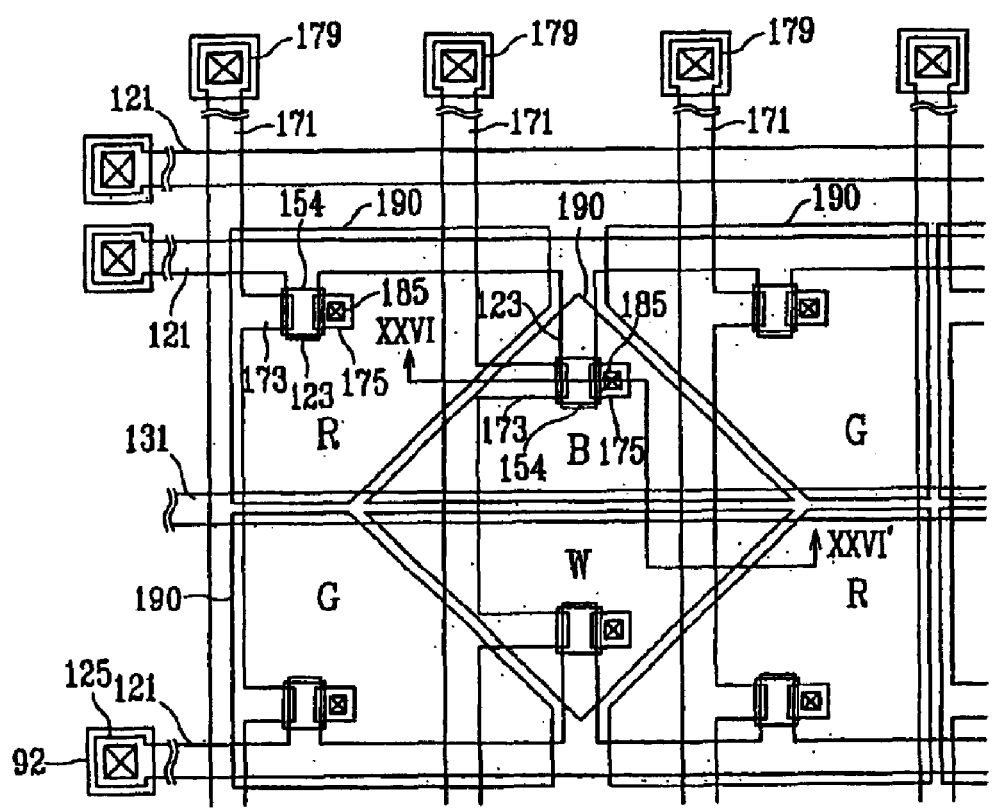
FIG. 25 is a layout view of a TFT array panel for an LCD according to another embodiment of the present invention.
Figure 26:
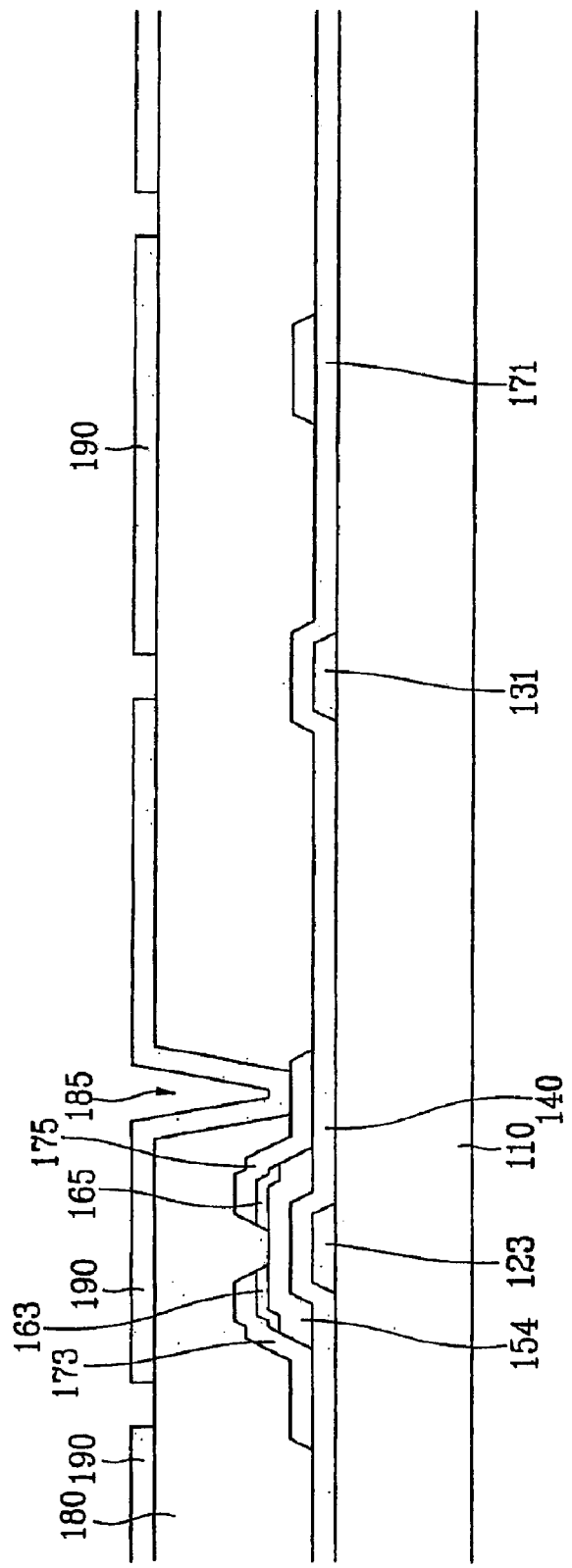
FIG. 26 is a sectional view of the TFT array panels shown in FIG. 25 taken along the line XXVI–XXVI'.

FIG. 25 is a layout view of a TFT array panel for an LCD according to another embodiment of the present invention, and FIG. 26 is a sectional view of the TFT array panels shown in FIG. 25 taken along the line XXVI–XXVI'.

As shown in FIGS. 25 and 26, a layered structure of a TFT array panel of an LCD according to this embodiment is almost the same as that shown in FIGS. 5 and 6. That is, a plurality of gate lines 121 including a plurality of gate electrodes 123 are formed on a substrate 110, and a gate insulating layer 140, a plurality of semiconductor islands 154, and a plurality of ohmic contact islands 163 and 165 are sequentially formed thereon. A plurality of data lines 171 including a plurality of source electrodes 173 and a plurality of drain electrodes 175 are formed on the ohmic contacts 161 and 165 and the gate insulating layer 140, and a passivation layer 180 is formed thereon. A plurality of contact holes 182, 185 and 189 are provided at the passivation layer 180 and/or the gate insulating layer 140, and a plurality of pixel electrodes 190 and a plurality of contact assistants 92 and 97 are formed on the passivation layer 180.

Referring to FIGS. 25 and 26, the pixel electrodes 190 of the pixels R, G, B and W resemble the shapes of the corresponding pixels shown in FIG. 22. A plurality of storage lines 131 extending substantially parallel to the gate lines 121 and made of the same material as the gate wire are formed on the substrate 110. The gate lines 121 and the storage lines 131 are located near the boundaries of the pixel rows, and the pixel electrodes 190 and the TFTs are symmetrically arranged with respect to the storage lines 131. The storage lines 131 overlap the pixel electrodes 190 adjacent thereto to form a plurality of storage capacitors.

Referring back to FIGS. 1 and 2, the gray voltage generator 800 generates two sets of a plurality of gray voltages related to the transmittance of the pixels and is provided on the data PCB 550. The gray voltages in one set have a positive polarity with respect to the common voltage Vcom, while those in the other set have a negative polarity with respect to the common voltage Vcom.

The gate driver 400 preferably includes a plurality of integrated circuit (IC) chips mounted on the respective gate FPC films 410. The gate driver 400 is connected to the gate lines $G_1$–$G_n$ of the panel assembly 300 and synthesizes the gate-on voltage Von and the gate off voltage Voff from the driving voltage generator 700 to generate gate signals for application to the gate lines $G_1$–$G_n$.

The data driver 500 preferably includes a plurality of IC chips mounted on the respective data FPC films 510. The data driver 500 is connected to the data lines $D_1$–$D_m$ of the panel assembly 300 and applies data voltages selected from the gray voltages supplied from the gray voltage generator 800 to the data lines $D_1$–$D_m$.

According to another embodiment of the present invention, the IC chips of the gate driver 400 and/or the data driver 500 are mounted on the lower panel 100, while one or both of the drivers 400 and 500 are incorporated along with other elements into the lower panel 100 according to still another embodiment. The gate PCB 450 and/or the gate FPC films 410 may be omitted in both cases.

The signal controller 600 controlling the drivers 400 and 500, etc. is provided on the data PCB 550 or the gate PCB 450.

Now, the operation of the LCD will be described in detail.

The signal controller 600 is supplied with RGB image signals R, G and B and input control signals controlling the display thereof such as a vertical synchronization signal Vsync, a horizontal synchronization signal Hsync, a main clock MCLK, and a data enable signal DE, from an external graphic controller (not shown). After generating gate control signals CONT1 and data control signals CONT2 and processing the image signals R, G and B suitable for the operation of the panel assembly 300 on the basis of the input control signals and the input image signals R, G and B, the signal controller 600 provides the gate control signals CONT1 for the gate driver 400, and the processed image signals R', G' and B' and the data control signals CONT2 for the data driver 500.

The gate control signals CONT1 include a vertical synchronization start signal STV for informing of start of a frame, a gate clock signal CPV for controlling the output time of the gate-on voltage Von, and an output enable signal OE for defining the width of the gate-on voltage Von. The data control signals CONT2 include a horizontal synchronization start signal STH for informing of start of a horizontal period, a load signal LOAD or TP for instructing to apply the appropriate data voltages to the data lines $D_1$–$D_m$, an inversion control signal RVS for reversing the polarity of the data voltages (with respect to the common voltage Vcom) and a data clock signal HCLK.

The data driver 500 receives a packet of the image data R', G' and B' for a pixel row from the signal controller 600 and converts the image data R', G' and B' into the analogue data voltages selected from the gray voltages supplied from the gray voltage generator 800 in response to the data control signals CONT2 from the signal controller 600.

Responsive to the gate control signals CONT1 from the signals controller 600, the gate driver 400 applies the gate-on voltage Von to the gate line $G_1$–$G_n$, thereby turning on the switching elements Q connected thereto.

The data driver 500 applies the data voltages to the corresponding data lines $D_1$–$D_m$ for a turn-on time of the switching elements Q (which is called "one horizontal period" or "1H" and equals to one periods of the horizontal synchronization signal Hsync, the data enable signal DE, and the gate clock signal CPV). Then, the data voltages in turn are supplied to the corresponding pixels via the turned-on switching elements Q.

The difference between the data voltage and the common voltage Vcom applied to a pixel is expressed as a charged voltage of the LC capacitor $C_{LC}$, i.e., a pixel voltage. The liquid crystal molecules have orientations depending on the magnitude of the pixel voltage and the orientations determine the polarization of light passing through the LC capacitor $C_{LC}$. The polarizers convert the light polarization into the light transmittance.

By repeating this procedure, all gate lines $G_1$–$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is called "frame inversion"). The inversion control signal RVS may be also controlled such that the polarity of the data voltages flowing in a data line in one frame are reversed (which is called "line inversion"), or the polarity of the data voltages in one packet are reversed (which is called "dot inversion").

Various types of inversions for an LCD according to embodiments of the present invention are described in detail with reference to FIGS. 27–29.

Figure 27:
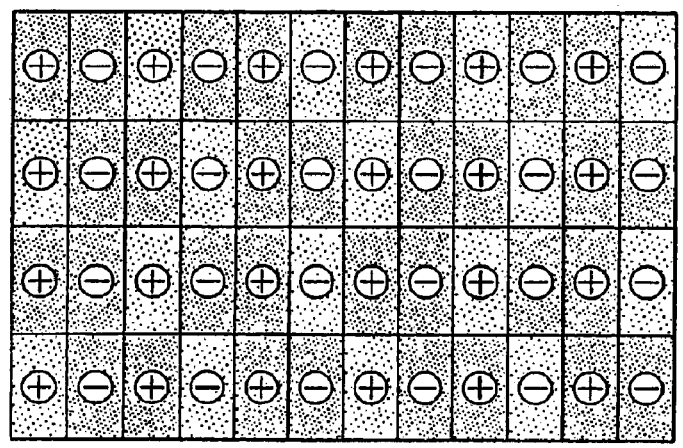
FIGS. 27 to 29 illustrate various polarity inversions of an LCD according to embodiment of the present invention.
Figure 28:
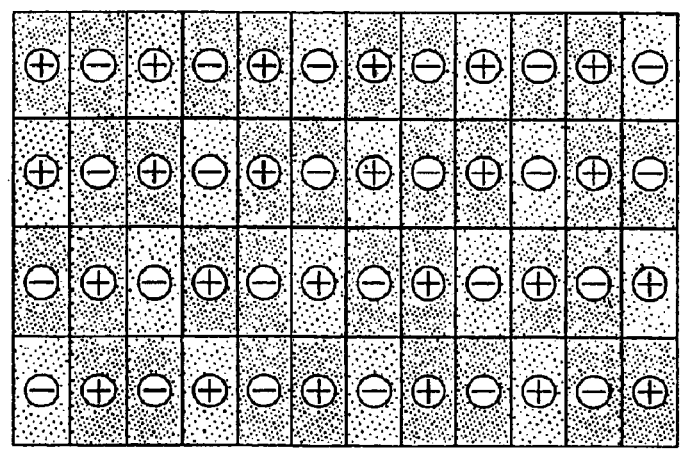
Figure 29:
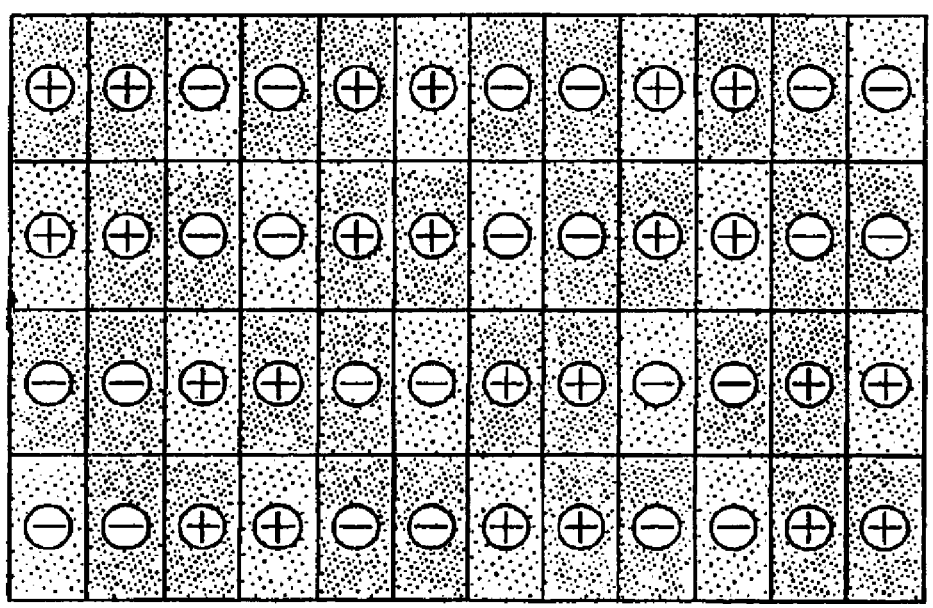

The inversions shown in FIGS. 27–29 can be adapted to the pixel arrangements shown in FIGS. 4A and 4B, 5A and 5B, 13–15, 21–23. As described above, the pixel arrangements are formed by repeatedly arranging a group of pixels including six pixels, i.e., two pixels near the center and four pixels disposed at both sides of the two pixels. Hereinafter, the two pixels near the center are referred to as center pixels, and the remaining four pixels are referred to as peripheral pixels. For a three color LCD, the center pixels represent one of red, green and blue colors, while the peripheral pixels represent the remaining two colors. For a four color LCD, the center pixels are blue and white pixels B and W, while the peripheral pixels are red and green pixels R and G.

FIG. 27 illustrates a column inversion that makes two adjacent pixels in a row have opposite polarity and two adjacent pixels in a column have equal polarity.

As shown in FIG. 27, since the pixels representing the same color in a pixel group have equal polarity, flicker, which is generated in dot inversion, is not generated. In addition, since the adjacent pixels in a row have opposite polarity and the adjacent pixels in a row for a color or a dot also have opposite polarity, horizontal cross-talk is prevented such that the characteristics of horizontal display are improved.

FIG. 28 illustrates a 2×1 inversion that makes two adjacent pixels in a row have opposite polarity and the polarity in a column alternate every two pixels.

The inversion shown in FIG. 28 also prevents the flicker since the pixels representing the same color in a pixel group have equal polarity. Since the adjacent pixels in a row have opposite polarity and the adjacent pixels in a row for a color also have opposite polarity, horizontal cross-talk is prevented such that the characteristics of horizontal display are improved. Moreover, since the polarity for any one color is inverted every pixel in a column, vertical cross-talk is also prevented.

FIG. 29 illustrates a 2×2 inversion that the polarity in a column and in a row is alternate every two pixels.

As shown in FIG. 28, the center pixels have equal polarity while the peripheral pixel pairs representing the same color have different polarity. However, since the peripheral pixel pairs representing corresponding colors have both positive and negative polarity, the brightness is averaged to be uniform and thus the flicker is prevented. Since the polarity in a row for a color is inverted every two pixels, the characteristics of horizontal display are improved. Furthermore, since the polarity for any one color is inverted in a column, vertical cross-talk is also prevented.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display comprising:
   an array of a plurality of sets of pixels, each set including blue and white pixels adjacent to each other, a pair of red pixels obliquely facing each other across the blue and the white pixels, and a pair of green pixels obliquely facing each other across the blue and the white pixels and adjacent to the red pixels, each pixel including a pixel electrode and a thin film transistor;
   a plurality of gate lines extending in a row direction for transmitting a gate signal to the pixels; and
   a plurality of data lines extending in a column direction for transmitting data signals to the pixels.

2. The liquid crystal display of claim 1, wherein the blue pixel and the white pixel in a set of pixels have equal polarity, the red pixels in the set have equal polarity, and the green pixels in the set have equal polarity.

3. The liquid crystal display of claim 2, wherein the polarity of the pixels are subject to column inversion.

4. The liquid crystal display of claim 2, wherein the polarity of the pixels are subject to 2×1 inversion.

5. The liquid crystal display of claim 1, wherein the blue pixel and the white pixel in a set of pixels have equal polarity, the red pixels in the set have opposite polarity, and the green pixels in the set have opposite polarity.

6. The liquid crystal display of claim 5, wherein the polarity of the pixels are subject to 2×1 inversion.

7. The liquid crystal display of claim 1, wherein relative positions of the blue pixel and the white pixel in two sets of pixels adjacent in a column direction or in a row direction are reversed.

8. The liquid crystal display of claim 1, wherein the pixels have rectangular shapes and the blue and the white pixels are arranged in the column direction to form a separate column.

9. The liquid crystal display of claim 1, wherein the blue pixel and the white pixel have triangular shapes to form a diamond shape.

10. The liquid crystal display of claim 9, wherein a boundary line between the blue pixel and the white pixel extends in the row direction or the column direction.

11. The liquid crystal display of claim 1, wherein the red pixels in adjacent two columns are located in different rows and the red pixels in adjacent rows are located in different columns, wherein the green pixels in adjacent two columns are placed in different rows and the green pixels in adjacent rows are located in different columns, and wherein either the blue pixels or the white pixels in two sets of pixels adjacent in the row direction are located in different rows, or the blue pixels or the white pixels in two sets adjacent in the column direction are located in different columns.

12. The liquid crystal display of claim 1, wherein the liquid crystal display is driven by rendering.

13. The liquid crystal display of claim 1, further comprising a backlight unit providing light for the pixels, wherein light emitted from the backlight unit has a color coordinate (x, y) where x ranges from about 0.31 to about 0.34, and y ranges from about 0.32 to about 0.35.

14. The liquid crystal display of claim 1, wherein the red, green and blue pixels further comprise red, green and blue organic filters containing red, green and blue pigments, respectively, and the white pixels include transparent organic filters.

15. The liquid crystal display of claim 14, wherein the red, green, blue and white pixels further comprise a common electrode formed on the organic filters.

16. The liquid crystal display of claim 15, wherein the red, green, blue and white pixels further comprise an overcoat located between the organic filters and the common electrode.

17. The liquid crystal display of claim 16, wherein the transparent organic filter includes the same material as the overcoat.

18. The liquid crystal display of claim 15, wherein the height of a surface of the overcoat is substantially uniform.

19. The liquid crystal display of claim 1, wherein the red, green, blue and white pixels further comprise red, green and blue color filters, respectively, and the red, green, blue and white pixels further comprise:

a protective layer formed on the thin film transistors, having a plurality of protrusions, and facing the color filters;

a common electrode formed on the color filters; and a liquid crystal interposed between the pixel electrode and the common electrode, wherein the protrusions are provided in the white pixels, and height of the common electrode is smaller at the white pixel than at the red, the green and the blue pixels.

20. The liquid crystal display of claim 19, wherein distance between the common electrode and a surface of the protective layer is substantially uniform.

21. The liquid crystal display of claim 14, wherein the pixel electrodes and the common electrode have cutouts.

22. A liquid crystal display comprising:

an array pixel including a plurality of pixels arranged in a matrix, the plurality of pixels including a set of pixels including a pair of center pixels adjacent to each other, and a pair of first-color pixels and a pair of second-color pixels obliquely facing each other across the center pixels, each pixel including a pixel electrode and a thin film transistor;

a plurality of gate lines extending in a row direction for transmitting a gate signal to the pixels; and a plurality of data lines extending in a column direction for transmitting data signals to the pixels, wherein the pixels are subject to polarity inversion.

23. The liquid crystal display of claim 22, wherein the center pixels in a set of pixels have equal polarity, the first-color pixels in the set have equal polarity, and the second-color pixels in the set have equal polarity.

24. The liquid crystal display of claim 23, wherein the polarity inversion includes column inversion.

25. The liquid crystal display of claim 23, wherein the polarity inversion includes 2×1 inversion.

26. The liquid crystal display of claim 22, wherein the center pixels in a set of pixels have equal polarity, the first-color pixels in the set have opposite polarity, and the second-color pixels in the set have opposite polarity.

27. The liquid crystal display of claim 26, wherein the polarity inversion includes 2×1 inversion.

28. The liquid crystal display of claim 22, wherein the center pixels represent blue color, and the first-color pixels and the second-color pixels represent green and red colors, respectively.

29. The liquid crystal display of claim 22, wherein the center pixels represent red color, and the first-color pixels and the second-color pixels represent green and blue colors, respectively.

30. The liquid crystal display of claim 22, wherein the center pixels represent blue and white colors, and the first-color pixels and the second-color pixels represent green and red colors, respectively.

31. The liquid crystal display of claim 22, wherein the center pixels have different saturation.

32. The liquid crystal display of claim 31, wherein the center pixels represent red color.

* * * * *